(12) United States Patent
Kuri

(10) Patent No.: US 9,578,183 B2
(45) Date of Patent: Feb. 21, 2017

(54) COLOR MEASUREMENT DEVICE, IMAGE FORMING APPARATUS, ELECTRONIC EQUIPMENT, COLOR CHART, AND COLOR MEASUREMENT METHOD

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/077,005

(22) Filed: Mar. 22, 2016

(65) Prior Publication Data
US 2016/0286054 A1 Sep. 29, 2016

(30) Foreign Application Priority Data
Mar. 23, 2015 (JP) .................. 2015-059831

(51) Int. Cl.
*H04N 1/04* (2006.01)
*H04N 1/00* (2006.01)
*G01J 3/52* (2006.01)

(52) U.S. Cl.
CPC ............ *H04N 1/00023* (2013.01); *G01J 3/52* (2013.01); *H04N 1/00005* (2013.01); *H04N 1/00034* (2013.01)

(58) Field of Classification Search
CPC ............ H04N 1/00023; H04N 1/00005; H04N 1/00034; G01J 2/52
USPC .................... 358/518, 504, 505, 1.9
See application file for complete search history.

(56) References Cited

U.S. PATENT DOCUMENTS 8,817,329 B2 * 8/2014 Satoh ............... G01J 3/462
358/1.9

FOREIGN PATENT DOCUMENTS

| JP | 11-142752 A | 5/1999 | |
|---|---|---|---|
| JP | 2001-320592 A | 11/2001 | |
| JP | 2005-260305 | * 9/2005 | .............. H04N 1/46 |
| JP | 2012-198177 A | 10/2012 | |
| JP | 2013-217654 A | 10/2013 | |

* cited by examiner

*Primary Examiner* — Houshang Safaipour
(74) *Attorney, Agent, or Firm* — Harness, Dickey & Pierce, P.L.C.

(57) ABSTRACT

A printer moves a color chart relative to a spectrometer that carries out spectral measurement on the color chart. The color chart, which is a color measurement target of the printer, includes a color patch and a white portion that is positioned in a first position and a second position. The first position and the second position interpose a color measurement position, in which the color patch is disposed, along a predetermined direction. The printer acquires measured values by carrying out spectral measurement for the color measurement position, the first position, and the second position, determines a reference value corresponding to the color measurement position based on the measured values of the first position and the second position, and determines a color measurement result of the color patch based on the measured value of the color measurement position and the reference value.

20 Claims, 14 Drawing Sheets

COLOR MEASUREMENT DEVICE, IMAGE FORMING APPARATUS, ELECTRONIC EQUIPMENT, COLOR CHART, AND COLOR MEASUREMENT METHOD

BACKGROUND

1. Technical Field

The present disclosure relates to a color measurement device, an image forming apparatus, electronic equipment, a color chart, a color measurement method, and the like.

2. Related Art

In the related art, there is known a recording apparatus provided with a transport mechanism that transports a recording medium, a recording head that adopts an ink jet recording system to record an image by ejecting ink onto the recording medium, and a color measurement unit that performs color measurement of the image which is recorded on the recording medium. See, for example JP-A-2013-217654.

In the recording apparatus described in JPA-2013-217654, a color measurement unit is provided with a color measurement carriage capable of moving along a recording medium, and a pressing plate which presses the recording medium. Of these elements, the color measurement carriage is configured to have a color measurement sensor disposed on the inner portion, and is capable of moving in directions orthogonally intersecting the direction in which a transport mechanism transports the recording medium. The recording apparatus moves the color measurement carriage along the pressing plate in relation to the recording medium and carries out the color measurement by the color measurement sensor in a state in which the recording medium is pressed by the pressing plate.

However, in the recording apparatus described in JP-A-2013-217654, when there is inconsistency in the thickness dimension of the pressing plate along the movement directions of the color measurement sensor, a measurement distance between the color measurement sensor and the recording medium varies depending on the position.

When cockling or waviness occurs in the recording medium due to the influence of variation in temperature and moisture, the recording medium is moved in the transport direction, and when the color measurement position on the recording medium is changed, the measurement distance may vary due to the influence of the waviness.

In this manner, when the measurement distance varies according to the color measurement position due to the influence of structural causes of the recording apparatus, waviness of the recording medium, or the like, the quantity of the light, which is reflected from the recording medium and is detected by the color measurement sensor, fluctuates. Therefore, in a case in which the reflectance, the chromaticity, or the like of a measurement target is calculated using reference values (i.e., measured values that are a light quantity values of a measurement wavelength) that are obtained by spectrally measuring a reference object (e.g., a white reference plate) disposed in a position which differs from the actual color measurement position, there is a concern that differences will arise in the measurement distances between the measurement positions of the reference object and the actual measurement positions. When the light quantity values of the reflected light fluctuate due to an error in the measurement distances, and an error in excess of an allowable amount arises between the appropriate reference values (ideal values) in the actual color measurement positions and the reference values which are the measured values of the reference object, there is a problem in that it is not possible to acquire, with high precision, the color measurement results of the reflectance, the chromaticity, or the like which are acquired based on the reference values.

SUMMARY

An advantage of some aspects of the present disclosure is to provide a color measurement device, an image forming apparatus, electronic equipment, a color chart, and a color measurement method, each of which is capable of improving color measurement precision.

According to an application example of the present disclosure, there is provided a color measurement device that includes a spectrometer, a movement mechanism, and a control device. The spectrometer disperses light from a measurement target, the movement mechanism moves the spectrometer relative to the measurement target, and the control device controls operations of the spectrometer and the movement mechanism. The measurement target includes a color patch and a reference color region. The reference color region includes a first position and a second position. The color patch is positioned between the first position and the second position, and the first position, the color patch, and the second position are disposed along a predetermined direction. The control device causes the spectrometer to carry out spectral measurement for each of the first position and the second position to acquire measured values. The control device further acquires a reference value corresponding to a color measurement position, which is a position in which the color patch is disposed based on the measured values at the first position and the second position, and acquires a color measurement result of the color patch based on the measured values which are acquired by causing the spectrometer to carry out the spectral measurement at the color measurement position and the reference value.

Note that, as the reference value, it is possible to exemplify a value which serves as a reference of the light quantity value when calculating the reflectance of the color patch, which is disposed in the color measurement position. More specifically, for example, the reference value is the measured values corresponding to the light quantity values at each measurement wavelength and is acquired when carrying out the spectral measurement for the light which is reflected from a target in which the reference color region, such as a white region, is disposed.

In this application example, the color patch of the measurement target in which the reference color region is disposed to interpose the color patch along the predetermined direction is subjected to color measurement. At this time, the spectrometer is moved relative to the measurement target, the measured values of each of the color measurement position in which the color patch is disposed, and the first position and the second position in which the reference color region is disposed to interpose the color patch along the predetermined direction, and the reference value corresponding to the color measurement position is acquired based on the measured values of the first position and the second position. The color measurement result of the color patch is acquired based on the measured values of the color measurement positions and the reference value.

In this manner, by acquiring the reference value based on the measured values of the reference color region at the first position and the second position, which interpose the color measurement position along the predetermined direction, it is possible to acquire the reference value according to the fluctuation and to improve the color measurement precision even if there is fluctuation in the measurement distance along the predetermined direction.

In the color measurement device according to the application example, the control device may cause the spectral measurement to be carried out for the measurement target in which the reference color region is disposed in another position differing from the first position and the second position along the predetermined direction, and acquires the measured value at the other position, and acquires the reference value based on the measured values at the first position, the second position, and the other position.

In this application example, the reference value is acquired based on the measured values of the reference color region at the first position, the second position, and the other position which are disposed along the predetermined direction. Accordingly, using the three or more above-described measured values along the predetermined direction, it is possible to acquire the reference value, and to more reliably suppress the influence of fluctuation in the measurement distance along the predetermined direction.

In the color measurement device according to the application example, the control device may cause the spectrometer to carry out the spectral measurement for the color patch of a position at which the measurement position is adjacent to the first position and the second position, and acquires the measured values.

In this application example, the reference value is acquired based on the measured values of the reference color region that is disposed in the first position and the second position, which are adjacent to the color measurement position.

Accordingly, it is possible to minimize the distance between the first position and the second position. Therefore, even in a case in which the measurement distance fluctuates along the predetermined direction interposing the color measurement position, it is possible to reduce the fluctuation amount of the measurement distance between the first position and the second position. Therefore, it is possible to improve the color measurement precision and to reduce the error of the reference value caused by large fluctuation in the measurement distance between the first position and the second position, where the fluctuation may be the difference between the reference value (the acquired value) and a measured value (an ideal value of the reference value) of a case in which the reference color region is hypothetically disposed in the color measurement position.

As described above, since the distance between the first position and the second position is minimized and it is possible to dispose the color measurement position in, for example, a position in the middle of the first position and the second position, even if the reference value is calculated using a simple method, such as calculating the average value of the measured values at the first position and the second position, it is possible to improve the color measurement precision.

In the color measurement device according to the application example, the control device may cause the spectrometer to carry out the spectral measurement for the measurement target in which the reference color region is disposed in a third position and a fourth position to acquire the measured values at the third position and the fourth position. The third position and the fourth position interpose the color measurement position along an intersecting direction which intersects the predetermined direction. The control device acquires the reference value based on the measured values at the first position, the second position, the third position, and the fourth position.

In this application example, for the color measurement target in which the reference color region is adjacent to the color measurement position along the intersecting direction, which intersects the predetermined direction, and is disposed in the third and fourth positions, which interpose the color measurement position, the spectral measurement is carried out at each position of the color measurement position, the first position, the second position, the third position, and the fourth position, and the measured values are acquired. The reference value is acquired based on the measured value corresponding to each position of the first position, the second position, the third position, and the fourth position.

Accordingly, in addition to the influence of fluctuation in the measurement distance along the predetermined direction, it is possible to suppress the influence of fluctuation in the measurement distance along the intersecting direction in the same manner, and to further improve the color measurement precision.

In the color measurement device according to the application example, the control device may acquire an average value of the measured values corresponding to the reference color region as the reference value corresponding to the color measurement position.

In this application example, the reference value is acquired by acquiring the measured values of the reference color region, which interposes the color patch, and calculating the average value of the acquired measured values. In this manner, in this application example, by calculating the reference value by using a simple method, it is possible to improve the color measurement precision and to suppress an increase in the processing load in the color measurement process.

In the color measurement device according to the application example, the control device may estimate fluctuation characteristics of the measured values along the predetermined direction based on the measured values acquired by having the spectrometer carry out spectral measurement for the measurement target in which the reference color region is disposed in a plurality of positions along the predetermined direction, and acquires the reference value based on the fluctuation characteristics.

In this application example, the spectral measurement is carried out for each of the reference color regions disposed in a plurality of positions (including the first position and the second position) along the predetermined direction, and the measured values are acquired. The fluctuation characteristics of the measured values along the predetermined direction are estimated based on the measured values for the acquired reference color regions, and the reference value of the color measurement position is acquired. Note that, an example of the estimation method of the fluctuation characteristics of the measured values is a method of applying polynomial approximation to the measured values at a predetermined wavelength for a plurality of reference color regions, and estimating the variation in the measured values in the predetermined direction.

Accordingly, it is possible to acquire the appropriate reference value according to the fluctuation characteristics of the measured values of the reference object in the predetermined direction. Therefore, it is possible to more reliably suppress the influence of fluctuation in the measurement distance in the predetermined direction, and to improve the color measurement precision.

In the color measurement device according to the application example, the movement mechanism may move the measurement target in the predetermined direction relative to the spectrometer, and the control device may cause the spectrometer to carry out spectral measurement for the measurement target in which the reference color region is disposed along the predetermined direction.

In this application example, the movement mechanism moves the measurement target in the predetermined direction relative to the spectrometer. The spectral measurement is carried out at a plurality of positions by moving the measurement target in which the reference color region is disposed along the predetermined direction to interpose the color patch in the predetermined direction.

In this case, since the spectral measurement target is fixed during the movement in the predetermined direction, the fluctuation in the measurement distance occurs mainly due to the influence of waviness (undulation) of the measurement target or the like. Therefore, by acquiring the reference color region based on the measured values of the reference color region, which is disposed along the predetermined direction, it is possible to suppress the influence of fluctuation in the measurement distance caused by waviness (undulation) of the measurement target along the predetermined direction, and to improve the color measurement precision.

In the color measurement device according to the application example, the movement mechanism may move the spectrometer in an intersecting direction which intersects the predetermined direction relative to the measurement target, and the control device may cause the spectrometer to carry out spectral measurement for the measurement target in which a plurality of the color patches is disposed along the intersecting direction and the reference color region is disposed in positions interposing each of the plurality of color patches along the predetermined direction.

In this application example, the movement mechanism moves the spectrometer in the intersecting direction relative to the measurement target. The spectral measurement is carried out for the measurement target in which the plurality of color patches is disposed along the intersecting direction and the reference color region is disposed to interpose each color patch in the predetermined direction, and each of the color patches is subjected to color measurement. In other words, the measured value of each of the plurality of color patches along the intersecting direction is acquired. The measured values of the plurality of reference color regions which interpose each of the color patches are acquired. The reference value of each of the color patches is acquired and the color measurement is carried out using the method described above.

In this case, since the spectrometer is moved relative to the color measurement target in the movement in the intersecting direction, the fluctuation in the measurement distance along the intersecting direction includes the influence of structural causes in the color measurement device described above. Here, hypothetically, in a case in which there is no influence of waviness of the measurement target, it is considered that the measurement distance will fluctuate depending on the measurement position in the intersecting direction regardless of the measurement position in the predetermined direction in the measurement target.

Therefore, it is possible to simultaneously suppress the influence of both the fluctuation in the measurement distance due to structural causes and the fluctuation in the measurement distance due to waviness of the measurement target by using the measured values of the reference color regions interposing each of the color patches by disposing the plurality of color patches along the intersecting direction.

As described above, during the color measurement of the plurality of color patches which are disposed on the measurement target, it is possible to suppress the influence of fluctuation in the measurement distance caused by both structural causes and waviness of the measurement target, and to improve the color measurement precision.

According to another application example, there is provided an image forming apparatus including the color measurement device according to the application example described above, and an image forming section which forms an image on a medium.

In this application example, it is possible to obtain the same effects as the color measurement device of the application example described above.

According to still another application example, there is provided electronic equipment which includes the color measurement device described above.

In this application example, it is possible to obtain the same effects as the color measurement device of the application example described above.

According to this application example, there is provided a color chart that is a measurement target which is subjected to color measurement by the color measurement device according to this application example, where the color chart includes a color patch, and a reference color region which is disposed in positions interposing the color patch along a first direction.

In this application example, it is possible to obtain the same effects as the color measurement device of the application example described above.

According to this application example, there is provided a color measurement method using a color measurement device that includes a spectrometer which disperses light from a measurement target, where the method includes acquiring measured values by carrying out spectral measurement for each of a color measurement position in which a color patch is disposed, and a first position and a second position in which a reference color region is disposed in a measurement target, which includes the color patch and the reference color region, where the reference color region is disposed to interpose the color patch along a predetermined direction. The method further includes acquiring a reference value corresponding to the color measurement position based on the measured values of the first position and the second position, and acquiring a color measurement result of the color patch based on the measured value of the color measurement position and the reference value, in which the color patch is positioned between the first position and the second position.

In this application example, it is possible to obtain the same effects as the color measurement device of the application example described above.

BRIEF DESCRIPTION OF THE DRAWINGS

The present disclosure will be described with reference to the accompanying drawings, wherein like numbers reference like elements.

DESCRIPTION OF EXEMPLARY EMBODIMENTS

First Embodiment

Hereinafter, description will be given of the first embodiment according to the present disclosure based on the drawings. In the present embodiment, hereinafter, description will be given of a printer 10 (an ink jet printer) which is an example of the image forming apparatus and the electronic equipment including the color measurement device of the present disclosure.

Schematic Configuration of Printer

Figure 1:
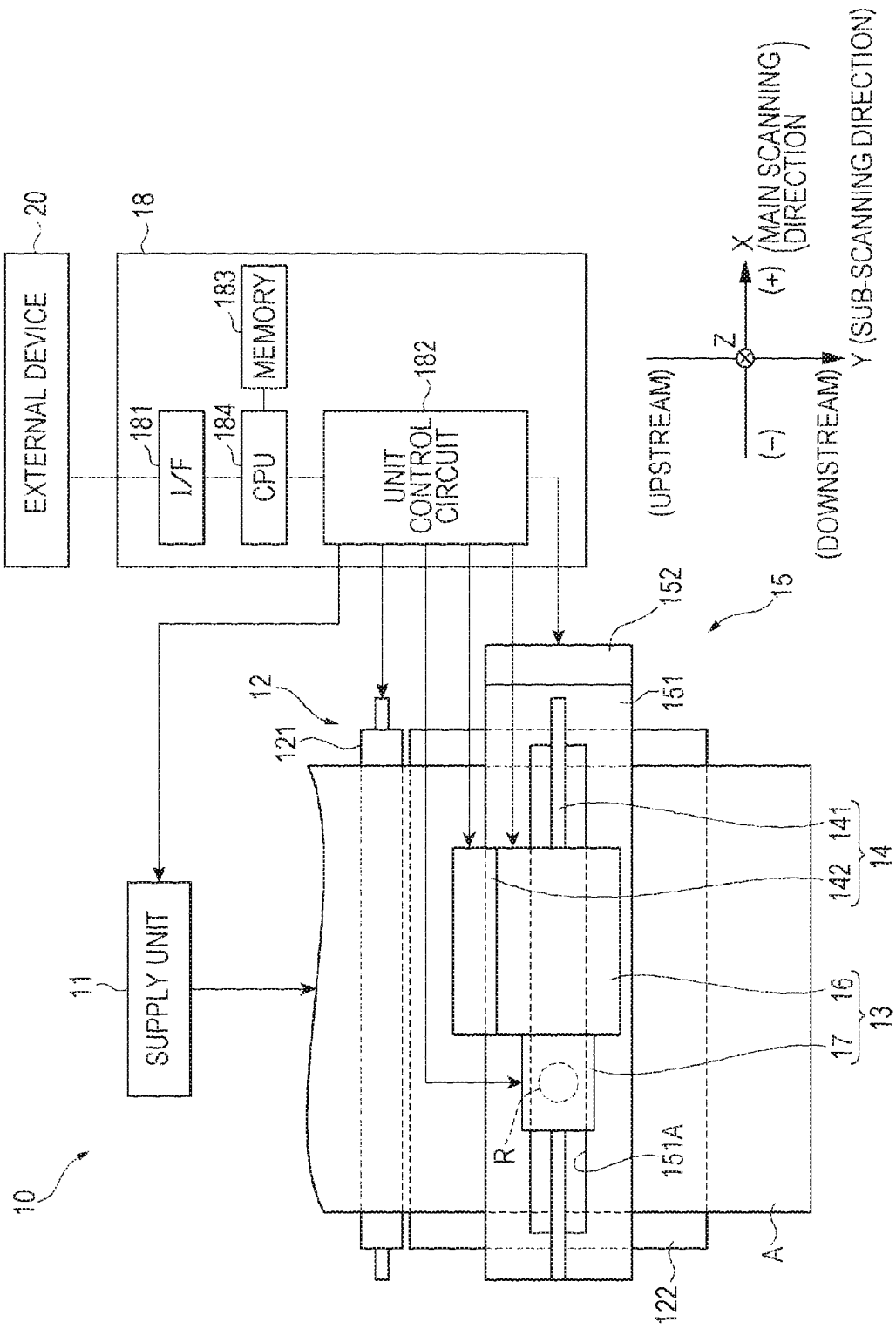
FIG. 1 is a block diagram illustrating the schematic configuration of a printer of a first embodiment according to the present disclosure.

FIG. 1 is a block diagram illustrating the schematic configuration of the printer 10 of the first embodiment.

As illustrated in FIG. 1, the printer 10 is provided with a supply unit 11, a transport unit 12, a carriage 13, a carriage movement unit 14, a paper retaining unit 15, and a control unit 18.

The printer 10 controls each of the units 11, 12, 14, and 15, and the carriage 13 based on print data which is input from an external device 20 such as a personal computer, and prints an image onto a medium A.

The printer 10 of the present embodiment forms a color chart 3 (refer to FIG. 7) in which a plurality of color patches 31 are disposed in predetermined positions on the medium A based on correction print data which is set in advance. The printer 10 performs spectral measurement on the color chart 3, and performs the color measurement process of the color patches 31 based on the spectral measurement results. At this time, a reference value, which is a value corresponding to a measured value of the reference object such as the white reference plate, is acquired according to the color measurement position in which each of the color patches 31 is positioned. The color measurement results of the color patches are acquired based on the reference values.

Hereinafter, specific description will be given of the configuration of the printer 10.

Configuration of Supply Unit

The supply unit 11 supplies the medium A (e.g., a white paper surface). The medium A is an image formation target to an image formation position. For example, the supply unit 11 is provided with a roll body (not shown), a roll drive motor (not shown), and a roll drive wheel train (not shown). The medium A is wound on the roll body. The roll drive motor is rotationally driven based on the commands from the control unit 18, and the rotational force of the roll drive motor is transmitted to the roll body via the roll drive wheel train. Accordingly, the roll body rotates and the paper surface which is wound on the roll body is supplied to the downstream side (the +Y direction) in the Y direction (i.e., the sub-scanning direction).

Note that, in the present embodiment, an example given in which the paper surface which is wound on the roll body is supplied; however, the present disclosure is not limited thereto. For example, the medium A may be supplied using any supply method, such as supplying a paper surface stacked on a tray or the like one sheet at a time using a roller or the like.

Configuration of Transport Unit

The transport unit 12 forms a movement mechanism of the present disclosure and transports the medium A which is supplied from the supply unit 11 along the Y direction. In other words, the transport unit 12 is a sub-scan moving unit which causes the carriage 13 to move relative to the medium A in the sub-scanning direction. The transport unit 12 is configured to include a transport roller 121, a driven roller (not shown), and a platen 122. The driven roller is disposed to pinch the medium A between the transport roller 121 and itself and is driven by the transport roller 121.

When the drive force from the transport motor (not shown) is transmitted to the transport roller 121 and the transport motor is driven under the control of the control unit 18, the transport roller 121 is rotationally driven by the rotational force and transports the medium A along the Y direction in a state in which the medium A is interposed between the transport roller 121 and the driven roller. The platen 122 facing the carriage 13 is provided on the downstream side (the +Y side) of the transport roller 121 in the Y direction.

Configuration of Carriage

The carriage 13 is provided with a printing section 16 and a spectrometer 17. The printing section 16 prints an image onto the medium A, and the spectrometer 17 performs spectral measurement of a predetermined measurement target region R (refer to FIG. 1) on the medium A.

The carriage 13 is provided to be capable of moving along the main scanning direction (the X direction) which intersects the Y direction due to the carriage movement unit 14.

The carriage 13 is connected to the control unit 18 via a flexible circuit (not shown) and carries out the printing process (i.e., the image forming process in relation to the medium A) of the printing section 16 and the spectral measurement process of the spectrometer 17 based on the commands from the control unit 18.

Note that, detailed description of the configuration of the carriage 13 will be given later.

Configuration of Carriage Movement Unit

The carriage movement unit 14 forms the movement mechanism of the present disclosure and moves the carriage reciprocally along the X direction (i.e., the main scanning direction) based on the commands from the control unit 18. In other words, the carriage movement unit 14 is a main-scan moving unit which causes the carriage 13 to move relative to the medium A in the main scanning direction.

For example, the carriage movement unit 14 is configured to include a carriage guide shaft 141, and a carriage movement mechanism 142.

The carriage guide shaft 141 is disposed along the X direction and both end portions are fixed to, for example, the housing of the printer 10.

The carriage movement mechanism 142 moves the carriage 13 along the carriage guide shaft 141. For example, the carriage movement mechanism 142 is configured to include a timing belt and a carriage motor. The portion of the carriage 13 is fixed to the timing belt, and the carriage motor drives the timing belt to move the carriage 13.

Detailed Configuration of Carriage

Next, description will be given of the configuration of the printing section 16 and the spectrometer 17 which are provided on the carriage 13 based on the drawings.

Configuration of Printing Section

The printing section 16 corresponds to an image forming section of the present disclosure and forms an image on the medium A by ejecting inks individually onto the medium A in a portion facing the medium A.

In the printing section 16, ink cartridges (not shown) corresponding to a plurality of colors of ink is mounted in a detachable manner. The ink is supplied from each of the ink cartridges to ink tanks (not shown) via tubes (not shown). A nozzle row including a plurality of nozzles which eject ink droplets and corresponding to each color of cyan C, magenta M, yellow Y, and black K is provided on the bottom surface (a position facing the medium A) of the printing section 16. Piezo elements are disposed in the nozzles, and, by driving the piezo elements, ink droplets supplied from the ink tank are ejected, land on the medium A, and dots are formed.

Configuration of Spectrometer

Figure 2:
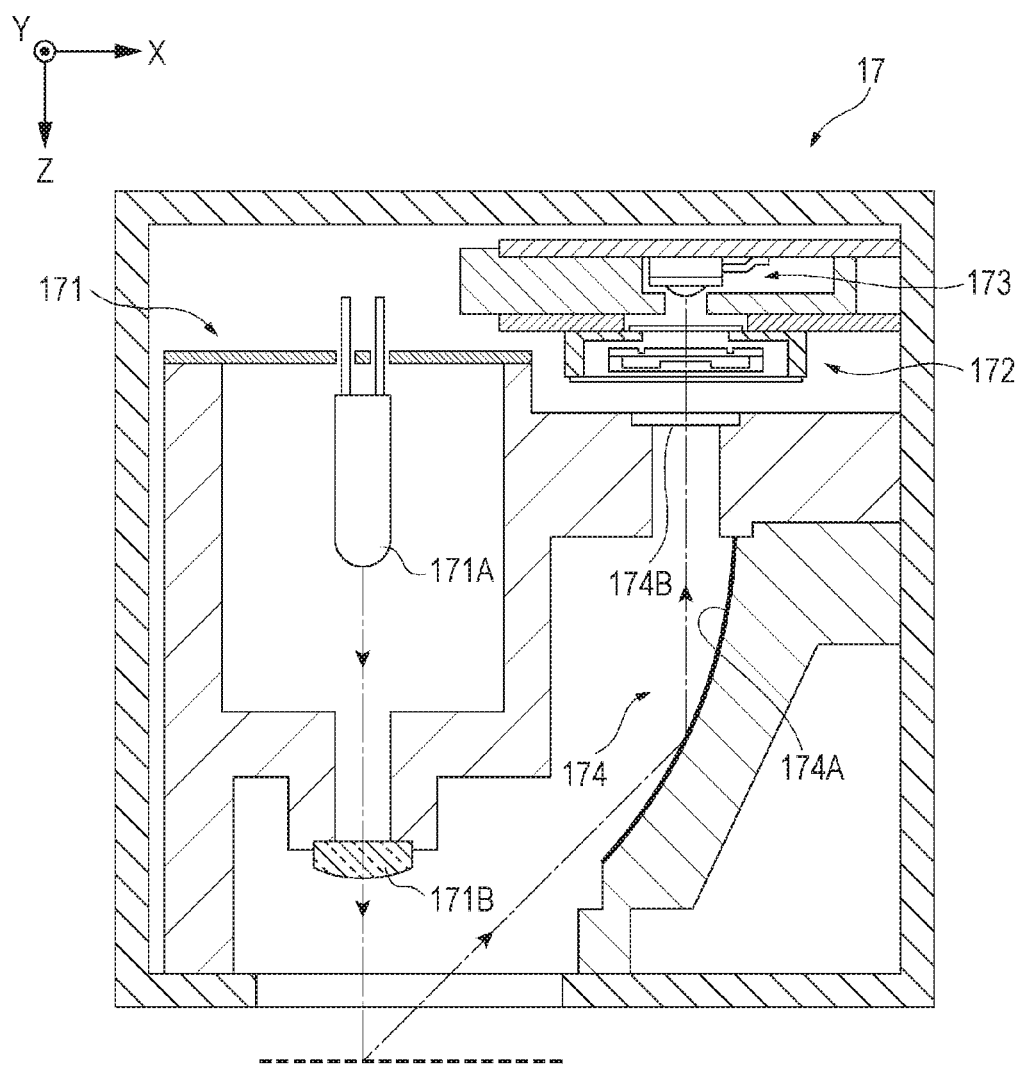
FIG. 2 is a sectional diagram illustrating a spectrometer of the first embodiment.

FIG. 2 is a sectional diagram illustrating the schematic configuration of the spectrometer 17.

As illustrated in FIG. 2, the spectrometer 17 is provided with a light source section 171, an optical filter device 172, a light receiving section 173, and a light guide section 174.

In the spectrometer 17, the medium A is irradiated with irradiation light from the light source section 171 (refer to FIG. 1), and the light which is reflected by the medium A is caused to be incident on the optical filter device 172 by the light guide section 174. Light of a predetermined wavelength included in the light reflected by the medium A is allowed to be transmitted (emitted) by the optical filter device 172, and is received by the light receiving section 173. The optical filter device 172 is capable of selecting the wavelength to transmit based on the control of the control unit 18, and it is possible to spectrally measure the measurement target region R on the medium A by measuring the light quantity of the light of each wavelength in visible light.

Configuration of Light Source Section

The light source section 171 is provided with a light source 171A and a condenser section 171B. The light source section 171 irradiates the measurement target region R of the medium A from the normal direction in relation to the surface of the medium A with the light emitted from the light source 171A.

A light source capable of emitting light of each wavelength in the visible light region is preferable as the light source 171A. For example, it is possible to exemplify a halogen lamp, a xenon lamp, or a white LED as the light source 171A, and, in particular, a white LED which can be easily installed within the limited space within the carriage 13 is preferable. The condenser section 171B is formed of, for example, a condenser lens and concentrates the light from the light source 171A on the measurement target region R. Note that, in FIG. 2, only one lens (the condenser lens) is displayed in the condenser section 171B; however, the condenser section 171B may be configured by combining a plurality of lenses.

Configuration of Optical Filter Device

Figure 3:
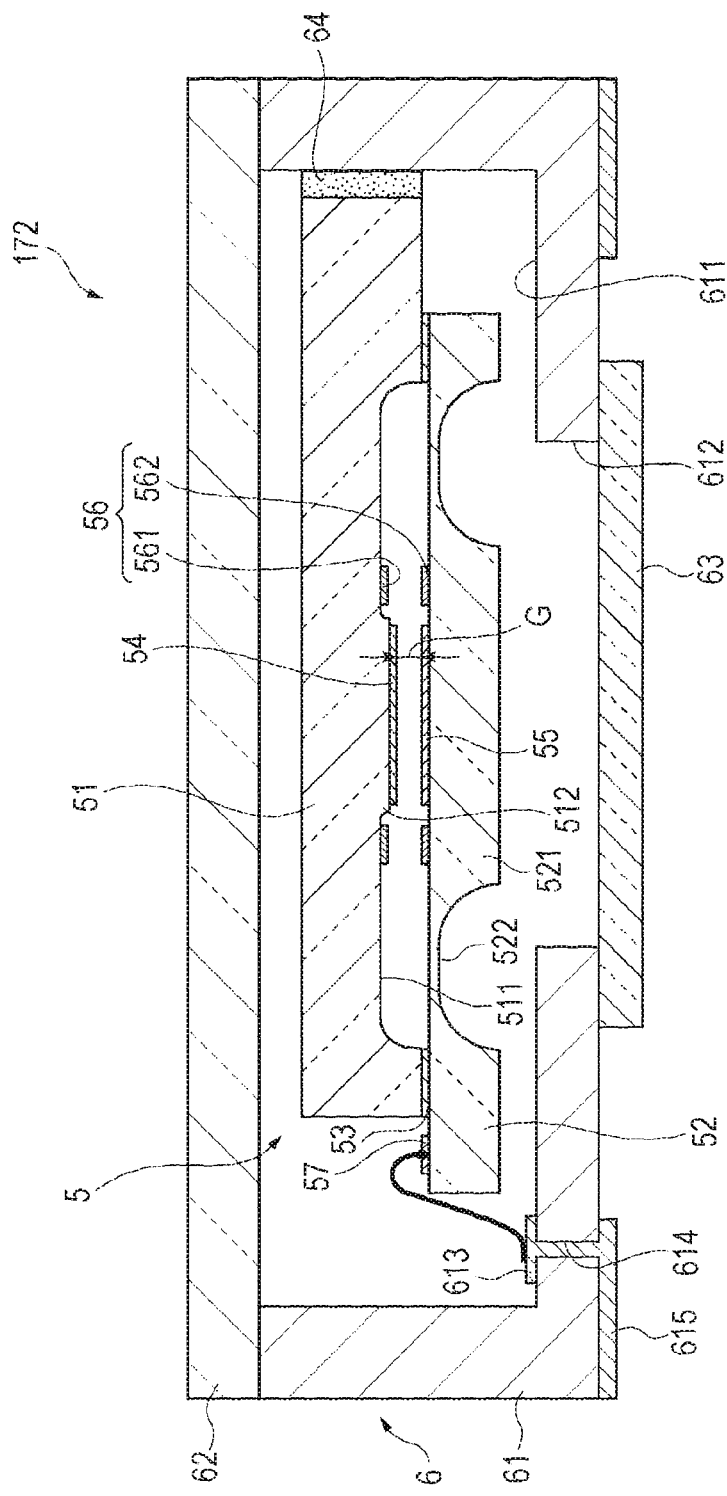
FIG. 3 is a sectional diagram illustrating an optical filter device of the first embodiment.

FIG. 3 is a sectional diagram illustrating the schematic configuration of the optical filter device 172.

The optical filter device 172 is provided with a housing 6 and a variable wavelength interference filter 5 (i.e., a variable wavelength filter) which is stored on the inner portion of the housing 6.

Configuration of Variable Wavelength Interference Filter

The variable wavelength interference filter 5 is a variable wavelength type Fabry-Pérot etalon device. As illustrated in FIG. 3, the variable wavelength interference filter 5 is provided with a fixed substrate 51 and a movable substrate 52, which are light transmissive and configured integrally by being bonded by a bonding film 53.

The fixed substrate 51 is provided with a first groove portion 511 and a second groove portion 512 which is shallower than the first groove portion 511. The groove portions 511 and 512 are formed by etching. A fixed electrode 561 is provided in the first groove portion 511, and a fixed reflecting film 54 is provided in the second groove portion 512.

The fixed reflecting film 54 is formed of, for example, a dielectric multilayer film in which high refraction layers and low refraction layers of metal films such as Ag and alloy films such as Ag alloys are laminated, or, is formed of a laminate in which metal films (alloy films) and dielectric films are laminated.

The movable substrate 52 is provided with a movable portion 521 and a holding portion 522. The holding portion 522 is provided on the outside of the movable portion 521 and holds the movable portion 521. A movable electrode 562 facing the fixed electrode 561 and a movable reflecting film facing the fixed reflecting film 54 are provided on a surface of the movable portion 521 facing the fixed substrate 51. A reflecting film of a similar configuration to the fixed reflecting film 54 described above is used as the movable reflecting film 55. The holding portion 522 is a diaphragm surrounding the periphery of the movable portion 521 and is formed to be smaller in the thickness dimension than the movable portion 521.

In the variable wavelength interference filter 5, an electrostatic actuator 56 is formed of the fixed electrode 561 and the movable electrode 562. By applying a voltage to the electrostatic actuator 56, it becomes possible to change the interval dimension of a gap G between the fixed reflecting film 54 and the movable reflecting film 55. A plurality of electrode pads 57 which are individually connected to the fixed electrode 561 and the movable electrode 562 are provided on the outer circumferential portion (i.e., a region not facing the fixed substrate 51) of the movable substrate 52.

Configuration of Housing

As illustrated in FIG. 3, the housing 6 is provided with a base 61 and a glass substrate 62. Due to the base 61 and the glass substrate 62 being, for example, bonded by low melting point glass bonding or the like, a storage space is formed on the inner portion thereof, and the variable wavelength interference filter 5 is stored in this storage space.

The base 61 is formed by laminating ceramic onto, for example, a thin substrate and includes a recess portion 611 capable of storing the variable wavelength interference filter 5. The variable wavelength interference filter 5 is fixed to the side surfaces of the recess portion 611 of the base 61 using a fixing material 64. A light-transmitting through hole 612 is provided in the bottom surface of the recess portion 611 of the base 61, and a cover glass 63 which covers the light-transmitting through hole 612 is bonded to the bottom surface.

An inside terminal section 613 which is connected to the electrode pads 57 of the variable wavelength interference filter 5 is provided on the base 61, and the inside terminal section 613 is connected to an outside terminal section 615 which is provided on the outside of the base 61 via a conducting hole 614. The outside terminal section 615 is electrically connected to the control unit 18.

Configuration of Light Receiving Section and Light Guide Optical System

Returning to FIG. 2, the light receiving section 173 is disposed over the optical axis of the variable wavelength interference filter 5 and receives the light which is transmitted by the variable wavelength interference filter 5. The light receiving section 173 outputs a detection signal (a current value) according to the received light quantity based on the control of the control unit 18. Note that, the detection signal which is output by the light receiving section 173 is input to the control unit 18 via an I-V converter (not shown), an amplifier (not shown), and an AD converter (not shown).

The light guide section 174 is provided with a reflecting mirror 174A and a band pass filter 174B.

The light guide section 174 reflects the light which is reflected by 45° in relation to the surface of the measurement target onto the optical axis of the variable wavelength interference filter 5 using the reflecting mirror 174A. The band pass filter 174B transmits light in the visible regions (e.g., 380 nm to 720 nm) and cuts ultraviolet and infrared light. Accordingly, light in the visible regions is incident on the variable wavelength interference filter 5, and the light of a wavelength selected by the variable wavelength interference filter 5 in the visible regions is received in the light receiving section 173.

Configuration of Paper Retaining Unit

Figure 4:
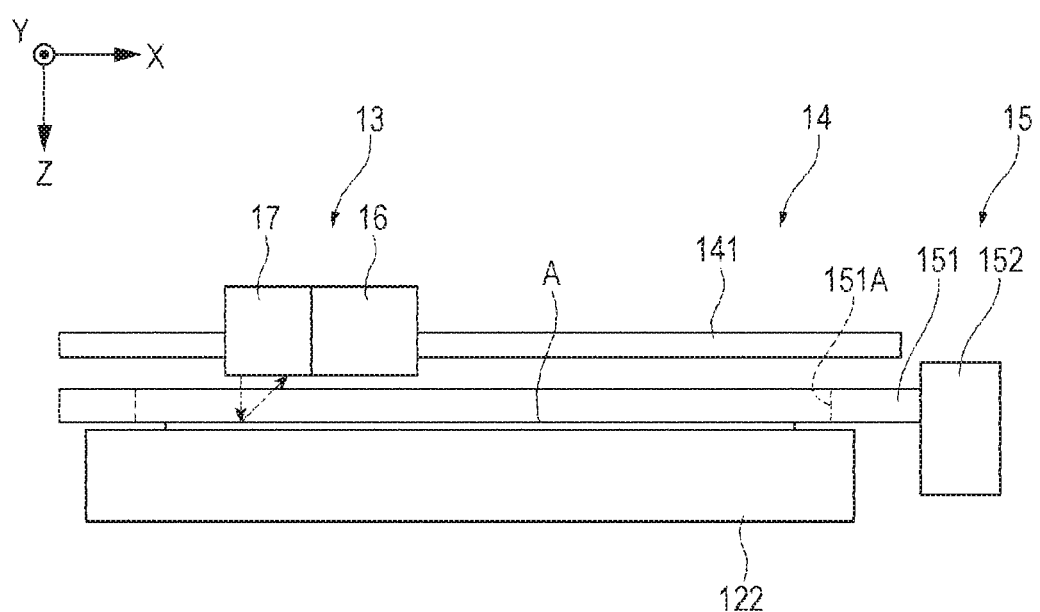
FIG. 4 is a schematic diagram illustrating a paper retaining unit of the first embodiment.

FIG. 4 is a diagram illustrating the schematic configuration of the paper retaining unit 15. Note that, FIG. 4 illustrates the schematic configuration when the paper retaining unit 15 is viewed from the +Y side toward the −Y side.

The paper retaining unit 15 presses the medium A into the platen 122 in the vicinity of the measurement target region R of the spectrometer 17. The paper retaining unit 15 is configured to include a paper retaining plate 151 and a paper retaining plate drive mechanism 152.

The paper retaining plate 151 is a plate-shaped member disposed between the carriage 13 and the platen 122, and is configured to be capable of pressing the medium A in the Z direction from one end in the X direction across to the other end. The paper retaining plate 151 includes a slit 151A which transmits the lighting light of the spectrometer 17 and the light which is reflected from the medium A such that the spectrometer 17 can subject the surface of the medium A to color measurement. The slit 151A is formed along the X direction corresponding to the movement range of the spectrometer 17 in the X direction.

Note that, examples of the configuration of the paper retaining plate 151 include a configuration in which the paper retaining plate 151 is formed using an elastic member, and a configuration in which a soft member is provided on the surface of a plate-shaped member of metal, resin, or the like. Accordingly, it is possible to press the medium A without causing the medium A to sustain damage.

The paper retaining plate drive mechanism 152 causes the paper retaining plate 151 to press the medium A by moving the paper retaining plate 151 along the Z direction. For example, the paper retaining plate drive mechanism 152 is configured to include a guide mechanism, an actuator, and the like. The guide mechanism moves the paper retaining plate 151 along the Z direction, and the actuator applies stress to the paper retaining plate 151 in a direction toward the medium A.

Note that, the paper retaining plate drive mechanism 152 may adopt a configuration in which the paper retaining plate 151 approaches the medium A (i.e., is a certain distance from the medium A) by rotating the paper retaining plate 151 around a rotating shaft. A configuration may be adopted in which the carriage 13 and the paper retaining plate 151 are caused to move or rotate integrally in relation to the platen 122.

Configuration of Control Unit

As illustrated in FIG. 1, the control unit 18 forms a control device of the present disclosure and is configured to include an I/F 181, a unit control circuit 182, a memory 183, and a central processing unit (CPU) 184.

The I/F 181 inputs the print data which is input thereto from the external device 20 to the CPU 184.

The unit control circuit 182 is provided with a control circuit which controls each of the supply unit 11, the transport unit 12, the carriage movement unit 14, the paper retaining unit 15, the printing section 16, and the spectrometer 17 (the light source 171A, the variable wavelength interference filter 5, and the light receiving section 173). The unit control circuit 182 controls the operations of each unit based on command signals from the CPU 184. Note that, the control circuit of each unit may be provided separately from the control unit 18 and be connected to the control unit 18.

The memory 183 stores various programs and various data which control the operations of the printer 10.

Examples of the various data include V-λ data indicating the wavelength of light which is transmitted by the variable wavelength interference filter 5 in relation to the voltage applied to the electrostatic actuator 56 when controlling the variable wavelength interference filter 5, print program file data which stores each ink ejection amount in relation to the color data included as print data, and the like.

Note that, the light emission properties (i.e., the emission spectrum) of the light source 171A in relation to each wavelength, the light receiving properties (i.e., the reception photo-sensitivity properties) of the light receiving section 173 in relation to each wavelength, and the like may also be stored.

Figure 5:
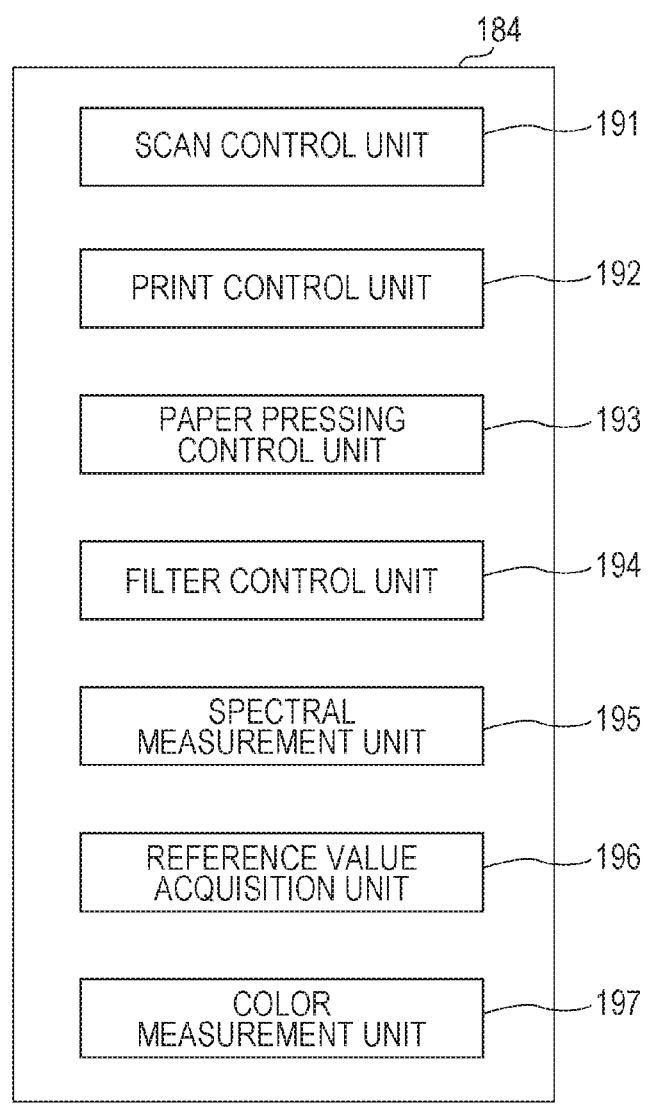
FIG. 5 is a block diagram illustrating the configuration of each function of a control unit in the first embodiment.

FIG. 5 is a block diagram illustrating the functional configuration of the CPU 184 of the control unit 18 of the printer 10.

As illustrated in FIG. 5, by reading and executing various programs stored in the memory 183, the CPU 184 functions as a scan control unit 191, a print control unit 192, a paper pressing control unit 193, a filter control unit 194, a spectral measurement unit 195, a reference value acquisition unit 196, and a color measuring unit 197.

The scan control unit 191 outputs a command signal to the unit control circuit 182 instructing the driving of the supply unit 11, the transport unit 12, and the carriage movement unit 14. Accordingly, the unit control circuit 182 supplies the medium A to the transport unit 12 by driving the roll drive motor of the supply unit 11. The unit control circuit 182 drives the transport motor of the transport unit 12 to transport a predetermined region of the medium A along the Y direction (the sub-scanning direction) to a position at which the region faces the carriage 13 of the platen 122. The unit control circuit 182 drives the carriage movement mechanism 142 of the carriage movement unit 14 to move the carriage 13 along the X direction (the main scanning direction).

The print control unit 192 outputs a command signal to the unit control circuit 182 instructing the control of the printing section 16 based on the print data. Note that, the print data may be stored in the memory 183, and may be input from the external device 20. In the present embodiment, as described later, the color chart 3 is printed by forming the plurality of color patches 31 on the medium A based on the print data. The color chart 3 will be described later.

When the command signal is output from the print control unit 192 to the unit control circuit 182, the unit control circuit 182 outputs a print control signal to the printing section 16, and ejects ink onto the medium A by driving the piezo elements provided in the nozzles such that the dot occupation rate of each color in each pixel becomes a value corresponding to the print control signal. Note that, when carrying out the printing, a dot forming operation in which the carriage 13 moves along the X direction and dots are formed by causing the ink to be ejected from the printing section 16 during the movement, and a transport operation in which the medium A is transported in the Y direction are repeated alternately, and an image formed of a plurality of dots is printed onto the medium A.

The paper pressing control unit 193 moves the spectrometer 17 along the main scanning direction, and when carrying out the spectral measurement of the plurality of measured values in the medium A, controls the paper retaining unit 15 and presses the medium A using the paper retaining plate 151 (a pressing state). At times other than during the spectral measurement (e.g., when transporting the medium A in the Y direction), the paper pressing control unit 193 controls the paper retaining unit 15 and releases the pressing state of the medium A by the paper retaining plate 151.

The paper pressing control unit 193 outputs a setting command signal to the unit control circuit 182 which sets the paper retaining plate drive mechanism 152 to either the pressing state or a press-released state. When the setting command signal for setting the pressing state is output from the paper pressing control unit 193 to the unit control circuit 182, the paper retaining plate drive mechanism 152 is driven, the paper retaining plate 151 moves toward the platen 122, and the medium A is pressed by the paper retaining plate 151. Meanwhile, when the setting command signal for releasing the pressing state is output, the pressing state is released. The transportation of the medium A along the Y direction by the transport unit 12 becomes possible due to the releasing of the pressing state.

The filter control unit 194 reads, from the V-λ data in the memory 183, a drive voltage to the electrostatic actuator 56 corresponding to the wavelength of light that the variable wavelength interference filter 5 is to be allowed to transmit and outputs a command signal to the unit control circuit 182. Accordingly, the unit control circuit 182 applies the drive voltage which is provided to the variable wavelength interference filter 5 as a command, and light of a predetermined transmission wavelength is transmitted by the variable wavelength interference filter 5.

The spectral measurement unit 195 measures the light quantity of the light which is transmitted by the variable wavelength interference filter 5 based on the detection signal which is output by the light receiving section 173 and acquires the measured value. The spectral measurement unit 195 performs the color measurement of the measurement target using the acquired measured value.

The reference value acquisition unit 196 acquires the reference values corresponding to the measured values in the color measurement positions in which the color patches are disposed. The reference values are based on the spectral measurement results (i.e., the measured values) of white portions 32 (refer to FIG. 7) that correspond to reference color regions disposed along the Y direction and interpose the color patches 31. The Y direction is the sub-scanning direction and may correspond to a predetermined direction of the present disclosure. The acquisition method of the reference values will be described later in detail.

The color measuring unit 197 subjects the color patches 31 to color measurement using the measured values which are the results of carrying out the spectral measurement on the color patches 31, which form the color chart 3, and the reference values, which are acquired by the reference value acquisition unit 196. In other words, the color measuring unit 197 carries out various processes relating to the color measurement such as acquiring the reflectance at each measurement wavelength of the color patches 31 using the acquired reference values.

Color Measurement Method

Next, the color measurement method which in the printer 10 of the present embodiment will be described based on the drawings.

Figure 6:
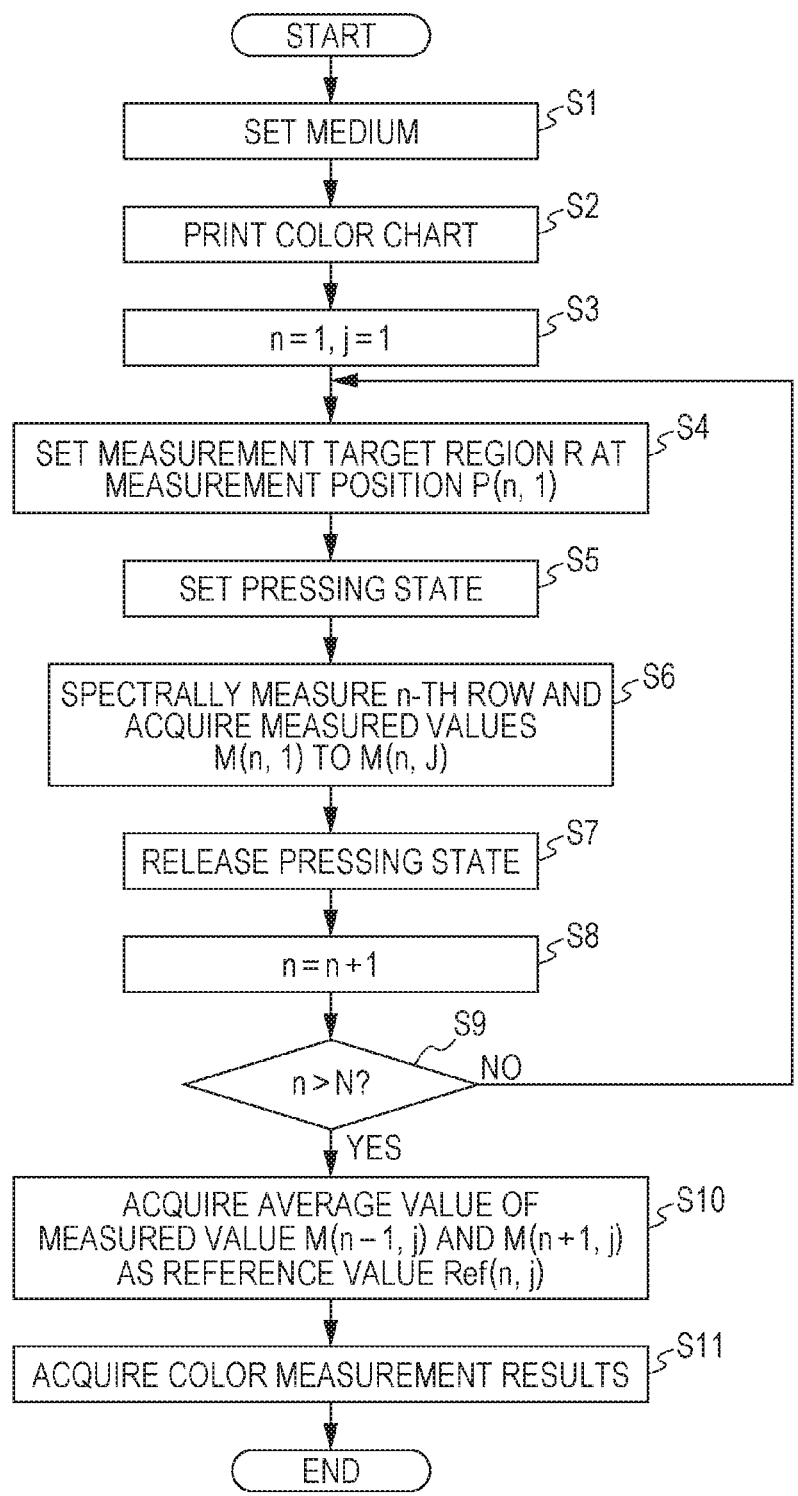
FIG. 6 is a flowchart illustrating a color measurement process in the printer of the first embodiment.

FIG. 6 is a flowchart illustrating the color measurement method in the printer 10.

Note that, in the present embodiment, the wavelength region which is the measurement target is a visible light region from, for example, 400 nm to 700 nm. The spectral measurement is carried out based on the light quantities of the light of 16 measurement wavelengths with a 20 nm interval, using 700 nm as the initial wavelength.

Formation of Color Chart

In the color measurement method of the printer 10, first, the color chart 3 is formed.

The scan control unit 191 sets the medium A in a predetermined position (step S1). In other words, the scan control unit 191 controls the supply unit 11 and the transport unit 12 to transport the medium A in the sub-scanning direction (the +Y direction), and a predetermined print starting position of the medium A is set on the platen 122. The scan control unit 191 moves the carriage 13 to an initial position (e.g., the −X side end portion in the main scanning direction).

Subsequently, the print control unit 192 reads the print data from the memory 183 and prints the color chart onto the medium A in synchronization with the control of the scan control unit 191 (step S2).

In other words, the scan control unit 191 causes the carriage 13 to scan at a fixed speed to the +X side. The print control unit 192 identifies the position of the printing section 16 of the carriage 13 according to the time from the start of the scanning and forms dots by ejecting ink from nozzles of predetermined colors onto predetermined positions based on the correction print data (a dot forming operation). When the carriage 13 moves to the +X side end portion, the scan control unit 191 controls the supply unit 11 and the transport unit 12 to transport the medium A in the +Y direction (a transport operation). The scan control unit 191 causes the carriage 13 to scan in the −X direction, and the print control unit 192 forms dots in predetermined positions based on the correction print data.

The color chart is formed on the medium A by repeating the dot forming operation and the transport operation described above.

Configuration of Color Chart

Figure 7:
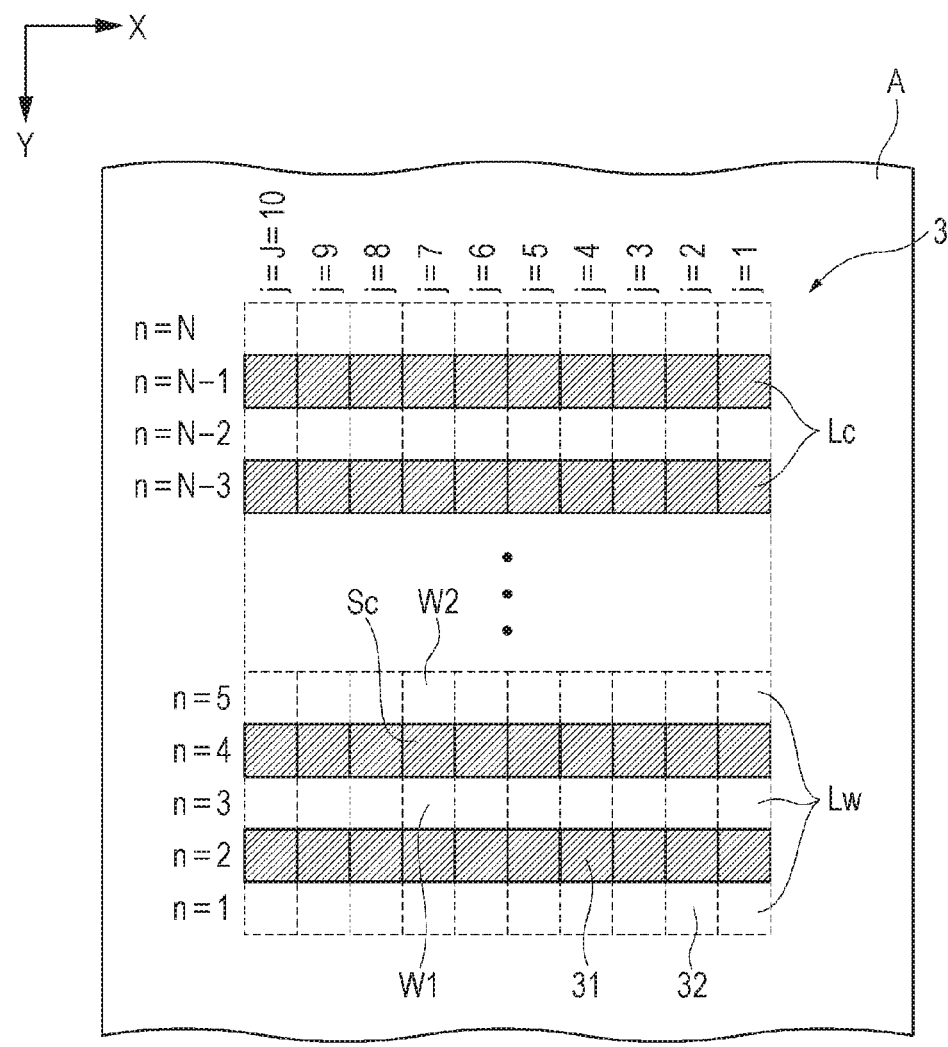
FIG. 7 is a diagram illustrating a color chart of the first embodiment.

FIG. 7 is a diagram schematically illustrating an example of the color chart which is formed in the present embodiment.

In the present embodiment, as illustrated in FIG. 7, the color chart 3 includes a plurality of color patch rows Lc and white rows Lw which are disposed in parallel in the X direction (the row direction), and the color patch rows Lc and the white rows Lw are disposed alternately along the Y direction (the column direction). The color patch rows Lc are disposed in the even rows and the white rows Lw are disposed in the odd rows, including the first and last rows.

Of these, the color patch rows Lc are configured to have a plurality of color patches 31 (e.g., 10) having different colors from each other along the X direction.

In the white rows Lw, the surface of the medium A is exposed. As illustrated in FIG. 7, the white rows Lw are described as the plurality of white portions 32 being disposed along the X direction. The reflectance (the ratio of the reflected light quantity to the lighting light quantity) of the white portions 32, which is the surface of the medium A, is a known value that is measured in advance and is stored in the memory 183.

Note that, in the following description, in the Y direction, from the +Y side toward the −Y side (in the −Y direction) corresponds to the first row to the N-th row. Note that, in the same manner, in the X direction, from the +X side toward the −X side (in the −X direction) corresponds to the first column to the J-th column.

The row number of the measurement target row is depicted as a variable n (where n is an integer of 1 to N) and the column number of the measurement target column is depicted as a variable j (where j is an integer of 1 to J). The positions of the measurement target color patches 31 and the measurement target white portions 32 are associated with a measurement position P(n, j). In other words, the printer 10 associates the position of the white portion 32 which is disposed in a position corresponding to the +X side end portion in the X direction and the +Y side end portion in the Y direction as with the measurement position P(1, 1) as the initial position. As described later, the spectral measurement is carried out on the color patches 31 and the white portions 32 corresponding to each of the measurement positions P(n, j), and the measured values M(n, j) are acquired.

Spectral Measurement Process

Returning to FIG. 6, after the color chart 3 is printed onto the medium A, the spectral measurement is carried out for each of the positions P(n, j) on the color chart 3. When carrying out the spectral measurement, first, the variable n corresponding to the row of the measurement position and the variable j corresponding to the column are initialized (step S3).

Next, the scan control unit 191 controls the transport unit 12 and the carriage movement unit 14 to transport the medium A along the Y direction and set the measurement target region R of the spectrometer 17 to the measurement position P(n, 1) of the n-th row which is the measurement target row in the color chart 3 (step S4).

Note that, directly after step S3, since the variables are set such that (n, j)=(1, 1), the white row Lw of the first row is the measurement target row, and the positions of the medium A and the carriage 13 are set such that the measurement target region R overlaps the white portion 32 corresponding to the position P(1, 1).

After step S4, the paper pressing control unit 193 sets the pressing state using the paper retaining plate 151 such that the medium A is pressed in relation to the platen 122 (step S5). Since the medium A is pressed, it is possible to suppress lifting in relation to the platen 122 caused by waviness, warping, or the like of the medium A. Therefore, it is possible to suppress the occurrence of measurement errors caused by the distance (the measurement distance) between the spectrometer 17 and the surface of the medium A conspicuously shortening due to the lifting of the medium A.

After the pressing state is set, the spectral measurement is carried out for each of the measurement positions P(n, 1) to P(n, J) corresponding to each row of the measurement target row (the n-th row), and the measured values M(n, 1) to M(n, J) are acquired (step S6).

In other words, the scan control unit 191 references the variables (n, j), and sets the main scanning position of the spectrometer 17 such that the measurement target region R overlaps the measurement position P(n, j). The filter control unit 194 sequentially changes the drive voltage applied to the electrostatic actuator 56 of the variable wavelength interference filter 5 to a value corresponding to each of the 16 bands, and the spectral measurement unit 195 acquires the 16 bands worth of output values (received light quantity values) and acquires the measured value M(n, j). Note that, when the measured value M(n, j) is acquired, 1 is added to the variable j, and the same process is carried out until the variable j exceeds the maximum value J (10 in the present embodiment).

The measured values M(n, 1) to M(n, J) in each of the measurement positions P(n, 1) to P(n, J) are acquired due to the spectral measurement being carried out in order from the first column to the J-th column. The acquired measured value M(n, j) is stored in the memory 183 together with the measurement position P(n, j).

Note that, the measured value M(n, j) is a measurement result of the white portion 32 in a case in which the measurement target row is an odd row (n is odd), and is a measurement result of the color patch 31 in a case in which the measurement target row is an even row (n is even).

After step S6, the paper pressing control unit 193 releases the pressing state (step S7). Accordingly, the medium A assumes a state in which the transport unit 12 can transport the medium A along the Y direction.

Next, 1 is added to the variable n (step S8), and it is determined whether or not the variable n has exceeded N, that is, whether or not the spectral measurement has been carried out for all measurement target rows of the color chart 3 (step S9).

In a case in which it is determined that the variable n is less than or equal to N (No in step S9), since the spectral measurement has not been performed for all of the measurement target rows, the process returns to step S4 and the processes of step S4 onward are carried out.

Meanwhile, in a case in which it is determined that the variable n is greater than N (Yes in step S9), since the spectral measurement is completed for all of the measurement target rows, the spectral measurement process is ended and the color measurement process described later is carried out.

Color Measurement Process

The color measurement process of each of the color patches 31 is carried out using the spectral measurement results of the color chart 3 which is acquired in the manner described above.

As illustrated as an example in FIG. 7, in the color measurement process of the present embodiment, for a color measurement position Sc in which the color patch 31 which is the measurement target on the medium A is disposed, the reference value corresponding to the measurement position Sc is acquired using the measured values of each of the white portions 32 of a first position W1 and a second position W2 which are adjacent to the color measurement position Sc in the Y direction.

In other words, as illustrated in FIG. 6, assuming the color measurement position Sc corresponds to the measurement position P(n, j), the reference value acquisition unit 196 acquires the measured value M(n−1, j) at the measurement position P(n−1, j) corresponding to the first position W1 and the measured value M(n+1, j) at the measurement position P (n+1, j) corresponding to the second position W2. The average value of the measured values M(n−1, j) and M(n+1, j) is calculated, and the average value is acquired as a reference value Ref(n, j) (step S10).

Specifically, using the measured values M(n−1, j) and M(n+1, j), the reference value acquisition unit 196 acquires the reference value of each band by calculating the average value for each of 16 bands worth of measurement wavelengths. The reference value acquisition unit 196 acquires the reference values in the same manner for all of the color patches 31 included in the color chart 3.

After step S10, the color measuring unit 197 performs the color measurement of the color patch 31 corresponding to the measurement position P(n, j) using the measured value M(n, j) and the reference value Ref(n, j) corresponding to the measurement position P(n, j) (step S11). As an example, the measured value M is divided by the reference value Ref, and the color measurement result is obtained by subjecting the result to spectral analysis. Once the color measurement is performed for all of the color patches 31, the color measuring unit 197 ends the process.

Operation Effects of First Embodiment

Here, when the distance (the measurement distance) between the medium A and the spectrometer 17 varies according to the color measurement position due to the influence of structural causes of the printer 10, waviness of the medium A, or the like, the light quantity of the light which is reflected from the medium A and is incident on the spectrometer 17 fluctuates. Thus, when the reflectance, the chromaticity, or the like of the color patch 31 is calculated using reference values, which are obtained by spectrally measuring a reference object such as a white reference plate disposed in a position that differs from the actual color measurement position, there is a concern that an error between the appropriate reference values (ideal values) in the actual color measurement positions and the reference values which are used may exceed an allowable amount. In addition, there is a concern that it is not possible to acquire, with high precision, the color measurement results of the reflectance, the chromaticity, or the like.

To handle this, in the printer 10 of the present embodiment, the reference value of the color measurement position Sc is acquired based on the measured value corresponding to the first position W1 and the second position W2 which interpose the color measurement position Sc in the Y direction which is the predetermined direction. The color measurement result of the color patch 31 disposed at the color measurement position Sc is acquired based on the measured value and the reference value of the color measurement position Sc.

Accordingly, even if the measurement distance fluctuates along the predetermined direction, it is possible to acquire a reference value corresponding to the fluctuation, and it is possible to improve the color measurement precision.

Figure 8:
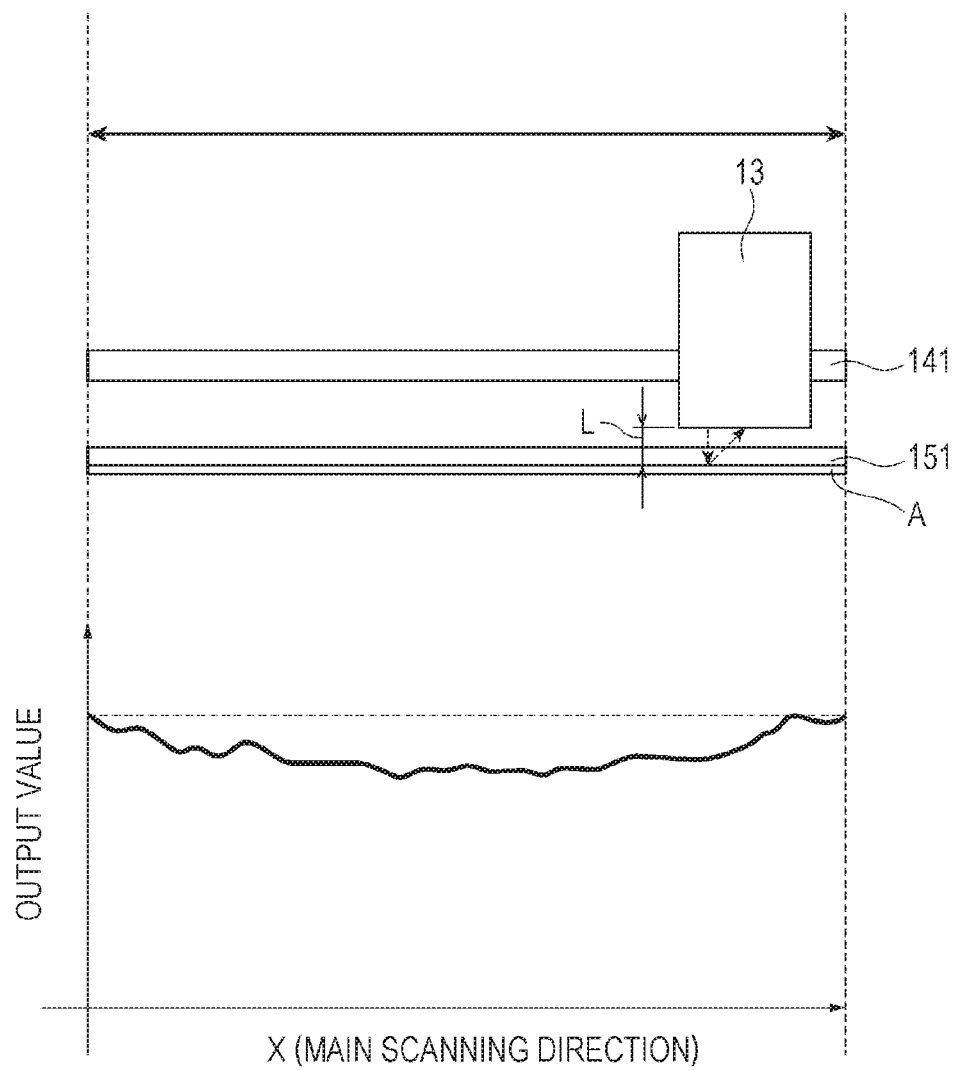
FIG. 8 is a diagram illustrating an example of output values when carrying out spectral measurement along an X direction in the printer of the first embodiment.

FIG. 8 is a diagram illustrating an example of output values corresponding to the light quantity received by the light receiving section 173 when moving the spectrometer 17 along the X direction and carrying out spectral measurement. Note that, in the example illustrated in FIG. 8, the light quantity of the light reflected from the white row Lw is measured in a state in which the transmission wavelength of the variable wavelength interference filter 5 is fixed to a predetermined wavelength.

Examples of structural causes which cause the above-described measurement distance to fluctuate include fluctuation in the thickness dimension (the Z direction dimension) of the paper retaining plate 151, inclination of the carriage guide shaft 141 of the carriage movement unit 14, and flexing caused by the weight of members such as the paper retaining plate 151 and the carriage guide shaft 141.

Here, the carriage movement unit 14 is designed to move the spectrometer 17 parallel to the platen 122 such that a measurement distance L is fixed during the main scanning. However, there is a case in which the measurement distance L fluctuates depending on the position in the X direction (the main scanning direction) due to structural causes. As illustrated in FIG. 8, when the measurement distance L fluctuates, the output values, that is, the light quantity (the received light quantity) of the reflected light fluctuates depending on the position in the main scanning direction.

The fluctuation in the measurement distance L due to structural causes depends on the position of the carriage 13 in the X direction. In other words, each measurement position belonging to the same column can be treated as being influenced in substantially the same manner for the influence of structural causes.

Therefore, by acquiring the reference value at the measurement positions using the measured values of the white portions 32 belonging to the same column as the measurement target color patch 31, it is possible to acquire a reference value which takes the influence of structural causes into account. Therefore, it is possible to suppress the influence of structural causes and it is possible to improve the color measurement precision.

Figure 9:
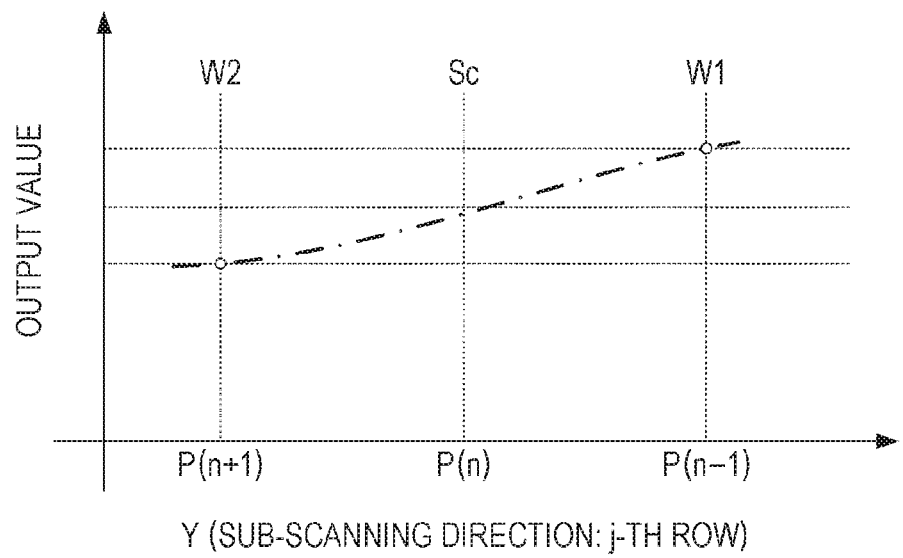
FIG. 9 is a diagram illustrating an example of output values when carrying out spectral measurement along a Y direction in the printer of the first embodiment.

FIG. 9 is a diagram illustrating an example of the relationship between each of the measurement positions P(n−1, j) and P(n+1, j) along the Y direction and the output values corresponding to the light quantity received by the light receiving section 173. Note that, in the example illustrated in FIG. 9, the output values for a predetermined wavelength among the measured values are illustrated as an example. In FIG. 9, the dot-dash line illustrates an example of the output values in the j-th column of a case in which the entire region of the j-th column is assumed to be a white region. For instance, even the color measurement position Sc is assumed to be a white color for the example diagram of FIG. 9.

Here, when waviness (for example, cockling, or warping of the medium caused by changed in the temperature or humidity) occurs in the medium A for reasons other than structural causes, there is a case in which the measurement distance L fluctuates according to the influence of the waviness. In this case, as illustrated in FIG. 9, the measurement distance L fluctuates even between measurement positions belonging to the same column, and the output values become different values between measurement positions belonging to the same column.

Even in this case, by acquiring the reference value Ref(n, j) at the measurement position P(n, j) using the measured values M(n−1, j), M(n+1, j) of the measurement positions P(n−1, j), P(n+1, j) of each of the white portions 32 interposing the measurement position P(n, j) of the color patch 31 in the Y direction, it is possible to suppress the influence of the waviness of the medium A.

In other words, even in a case in which the output values increase (or decrease) between the two measurement positions P(n−1, j) and P(n+1, j) as illustrated in FIG. 9, by acquiring the average value of the measured values, it is possible to acquire a more appropriate reference value than in a case in which the measured value of one of the measurement positions P(n−1, j) and P(n+1, j) is referenced. In this manner, by acquiring the reference value using the measured values of a plurality of measurement positions, it is possible to acquire a more appropriate reference value.

In the present embodiment, the average value of the measured values M(n−1, j) and M(n+1, j) of each of the measurement positions P(n−1, j) and P(n+1, j) adjacent to the measurement position P(n, j) in the Y direction is used as the reference value Ref(n, j).

Accordingly, it is possible to reduce the distance between the first position W1 and the second position W2 in relation to the color measurement position Sc in comparison to a case in which the first position W1 and the second position W2 are not adjacent to the color measurement position Sc. Therefore, it is possible to reduce the fluctuation amount of the measurement distance L between the first position W1 and the second position W2. Therefore, it is possible to reduce the difference between each of the measured values M(n−1, j) and M(n+1, j) of the first position W1 and the second position W2 and the ideal value of the reference value at the measurement position Sc, and it is possible to acquire a more appropriate reference value.

Since the color measurement position Sc is disposed in a position in the middle of the first position W1 and the second position W2, it is possible to reduce the difference between the reference value which is acquired as the average value and the ideal value of the reference value at the color measurement position Sc.

Here, by reducing the distance between the first position W1 and the second position W2, it is possible to reduce the fluctuation amount of the measurement distance L between the first position W1 and the second position W2. Accordingly, as illustrated in FIG. 9, it is possible to suppress the variation amount of the measurement distance L to an extent at which the variation in the output values between the first position W1 and the second position W2 is treated as substantially linear variation, and it is possible to improve the color measurement precision even if the reference value is acquired using a simple method of calculating the average value.

Note that, it is possible to suppress an increase in the processing load by using the simple method of calculating the average value.

In the printer 10, the color chart 3 in which the white portions 32 are disposed to interpose the color patches 31 along the Y direction (the sub-scanning direction, corresponding to the predetermined direction of the present disclosure), and a plurality of the color patches 31 is disposed along the X direction (the main scanning direction, corresponding to the intersecting direction of the present disclosure) is used as the measurement target. The printer 10 moves the spectrometer 17 in the X direction, moves the medium onto which the color chart 3 is printed in the Y direction in relation to the spectrometer 17, carries out the spectral measurement for each measurement position, and acquired the measured values.

In this case, since the spectrometer 17 is moved in the X direction, the fluctuation in the measurement distance L along the X direction includes structural causes, and by acquiring the reference value using the measured values of the white portions 32 belonging to the same column as the measurement target color patch 31, it is possible to suppress the influence of structural causes, and this is as described above.

It is also described above that by acquiring the reference value using the measured values of the white portions 32 interposing the color patch 31 along the Y direction (the sub-scanning direction), it is possible to suppress the influence of the waviness of the medium A.

As described above, it is possible to suppress the influence of fluctuation in the measurement distance caused by both structural causes and waviness of the measurement target, and it is simultaneously possible to improve the color measurement precision in the same manner in relation to the plurality of color patches 31.

Second Embodiment

Next, description will be given of the second embodiment according to the present disclosure. Note that, in the following description, aspects of the configuration and processes which are the same as those of the first embodiment will be assigned the same reference symbols, and description thereof will be omitted or simplified.

In the first embodiment described above, a configuration is exemplified in which the reference value corresponding to a color patch is acquired using the measured values of two white portions which interpose the color measurement target color patch in the Y direction which is the predetermined direction. With regard to this, in the present embodiment, the reference value is acquired using four measured values of two white portions which interpose the color measurement target color patch along the Y direction and two white portions which interpose the color patch along the X direction.

Figure 10:
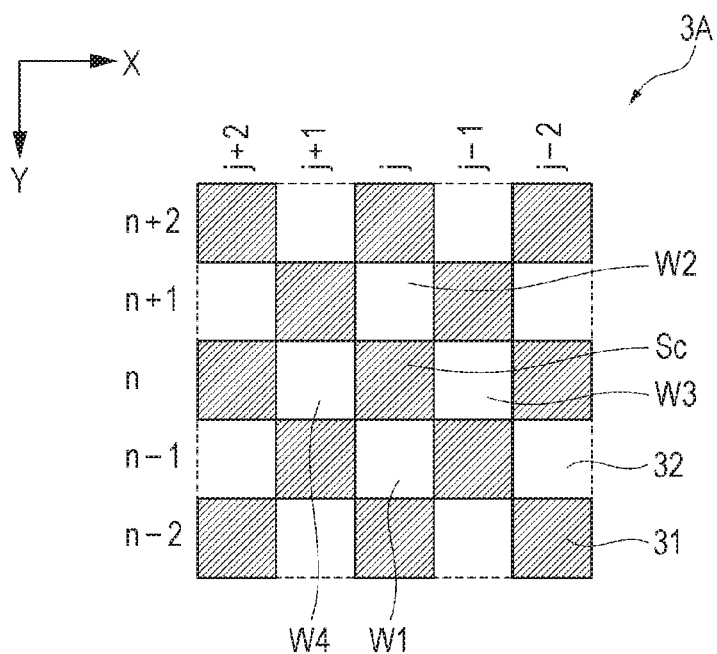
FIG. 10 is a diagram illustrating an example of a color chart of a second embodiment.

FIG. 10 is a diagram illustrating a color chart 3A of the present embodiment. Note that, in FIG. 10, only a portion of the color chart 3A is illustrated.

As illustrated in FIG. 10, in the color chart 3A, the white portions 32 are disposed in positions adjacent to the color patches 31 in the X direction and the Y direction. Note that, although omitted from the drawings, the first row and the last row are white rows.

In the present embodiment, the color measurement method which is carried out by the printer 10 is essentially the same as in the first embodiment except for the process of acquiring the reference values.

In other words, when carrying out the color measurement, the printer 10 carries out the spectral measurement for each of the measurement positions in the same manner as in the first embodiment, and acquires the measured values.

When performing the color measurement of the color measurement position Sc in the color chart 3A which is printed onto the medium A, the reference value corresponding to the color measurement position Sc is acquired using the measured values of the four white portions 32: the first position W1 and the second position W2 which are adjacent to the color measurement position Sc in the Y direction; and a third position W3 and a fourth position W4 which are adjacent to the color measurement position Sc in the X direction.

In other words, in a case in which the color measurement position Sc is the measurement position P(n, j), the reference value acquisition unit 196 acquires the measured values M(n−1, j), M(n+1, j), M(n, j−1), and M(n, j+1) at the respective measurement positions P(n−1, j), P(n+1, j), P(n, j−1), and P(n, j+1) corresponding to each of the positions described above. The reference value acquisition unit 196 calculates the average value using the four measured values and uses the average value as the reference value Ref(n, j).

Operation Effects of Second Embodiment

According to the present embodiment, in addition to the effects of the first embodiment, it is possible to obtain the following operation effects.

In the present embodiment, for the reference value, the reference value corresponding to the color measurement position Sc is acquired using the measured values of the four white portions 32 (i.e., first position W1 and the second position W2, which are adjacent in the Y direction to the color measurement position Sc, and the third position W3 and the fourth position W4, which are adjacent to the color measurement position Sc in the X direction).

Accordingly, in the same manner as in the first embodiment, it is possible to suppress a reduction in the color measurement precision caused by fluctuation in the measurement distance L along the Y direction caused by waviness of the medium A or the like. Even for the fluctuation in the measurement distance L along the X direction, it is possible to suppress a reduction in the color measurement precision caused by fluctuation in the measurement distance L in the same manner as in the sub-scanning direction, and it is possible to carry out the color measurement with higher precision.

Third Embodiment

Next, description will be given of the third embodiment according to the present disclosure.

In the second embodiment described above, a configuration is exemplified in which the reference value is acquired using the measured values of the four white portions interposing the color patch along two directions of the X direction and the Y direction. With regard to this, in the present embodiment, the reference value is acquired using the color measurement values of a plurality of white portions which are arranged around the color measurement target color patch, including the four white portions described in the second embodiment.

Figure 11:
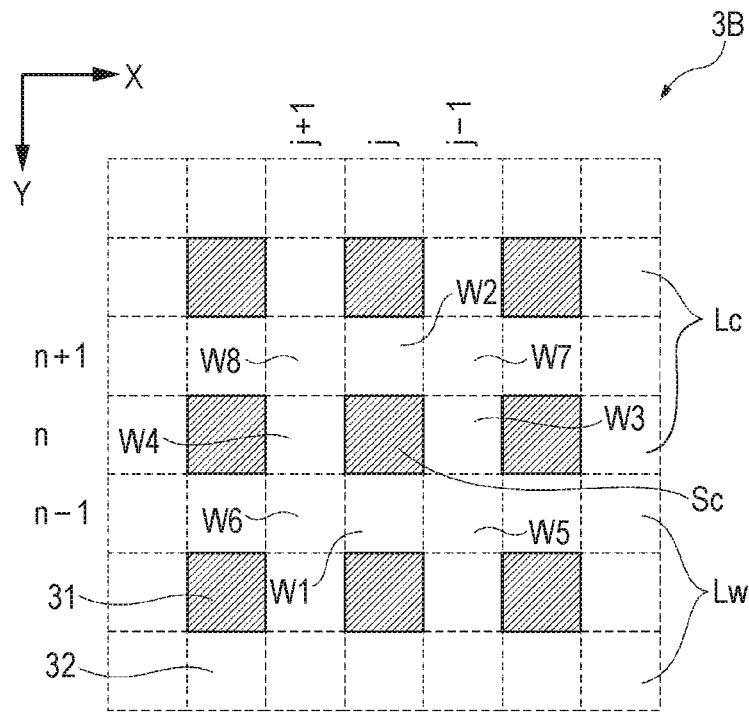
FIG. 11 is a diagram illustrating an example of a color chart of a third embodiment.

FIG. 11 is a diagram illustrating a color chart 3B of the present embodiment. Note that, in FIG. 11, only a portion of the color chart 3B is illustrated.

As illustrated in FIG. 11, in the color chart 3B, the color patch rows Lc and the white rows Lw are disposed alternately along the Y direction. In the color patch rows Lc, the color patches 31 and the white portions 32 are disposed alternately along the X direction (the main scanning direction). Note that, even in a case in which viewed along the column direction, in the same manner, a column including the color patches 31 and a column of only the white portions 32 are disposed alternately in the X direction. In the columns including the color patches 31, the color patch 31 and the white portion 32 are disposed alternately along the Y direction. In the color chart 3B, the white portions 32 are disposed in all of the positions adjacent to the color patch 31.

In the present embodiment, the color measurement method which is carried out by the printer 10 is essentially the same as in the first embodiment except for the process of acquiring the reference values.

In other words, when carrying out the color measurement, the printer 10 carries out the spectral measurement for each of the measurement positions in the same manner as in the first embodiment, and acquires the measured values.

When performing the color measurement of the color measurement position Sc in the color chart 3B which is printed onto the medium A, the reference value corresponding to the color measurement position Sc is acquired using the measured values of the white portions 32 which are disposed in the eight positions around the color measurement position Sc. As illustrated in FIG. 11, the eight positions are the first position W1 to the fourth position W4 which are adjacent to the color measurement position Sc, a fifth position W5 and a sixth position W6 which are adjacent to the first position W1 along the X direction, and a seventh position W7 and an eighth position W8 which are adjacent to the second position W2 along the X direction.

In other words, in a case in which the color measurement position Sc is the measurement position P(n, j), the reference value acquisition unit 196 acquires each of the measured values M(n−1, j), M(n+1, j), M(n, j−1), M(n, j+1), M(n−1, j−1), M(n−1, j+1), M(n+1, j−1), and M(n+1, j+1) at the respective measurement positions described above. The reference value acquisition unit 196 calculates the average value using the eight measured values, and uses the average value as the reference value Ref(n, j).

Operation Effects of Third Embodiment

According to the present embodiment, in addition to the effects of the embodiments described above, it is possible to obtain the following operation effects.

In the present embodiment, for the reference value, the reference value corresponding to the color measurement position Sc is acquired using the measured values of the plurality of white portions 32 which are disposed adjacent to the measurement target color patch 31 in the periphery thereof (e.g., eight adjacent on the four sides and the diagonal directions).

Accordingly, in the same manner as in the embodiments described above, it is possible to suppress a reduction in the color measurement precision caused by fluctuation in the measurement distance L along the X direction (the main scanning direction) and the Y direction (the sub-scanning direction) caused by waviness of the medium A. In the present embodiment, it is possible to suppress a reduction in the color measurement precision in the same manner for a direction from the fifth position W5 toward the eighth position W8, a direction from the sixth position W6 toward the seventh position W7, and for directions which are diagonal in relation the main scanning direction. Therefore, it is possible to more reliably suppress a reduction in the color measurement precision caused by waviness of the medium A, and it is possible to carry out the color measurement with higher precision.

Fourth Embodiment

Next, description will be given of the fourth embodiment according to the present disclosure.

In the first embodiment described above, a configuration is exemplified in which the reference value corresponding to a color patch is acquired by calculating the average value of two white portions which interpose the color measurement target color patch in the Y direction. In regard to this, in the present embodiment, the variation in the output values in the Y direction is estimated using the plurality of white portions which are disposed on the +Y side of the color measurement target color patch and the plurality of white portions which are disposed on the −Y side, and the reference value corresponding to the color patch is obtained.

Figure 12:
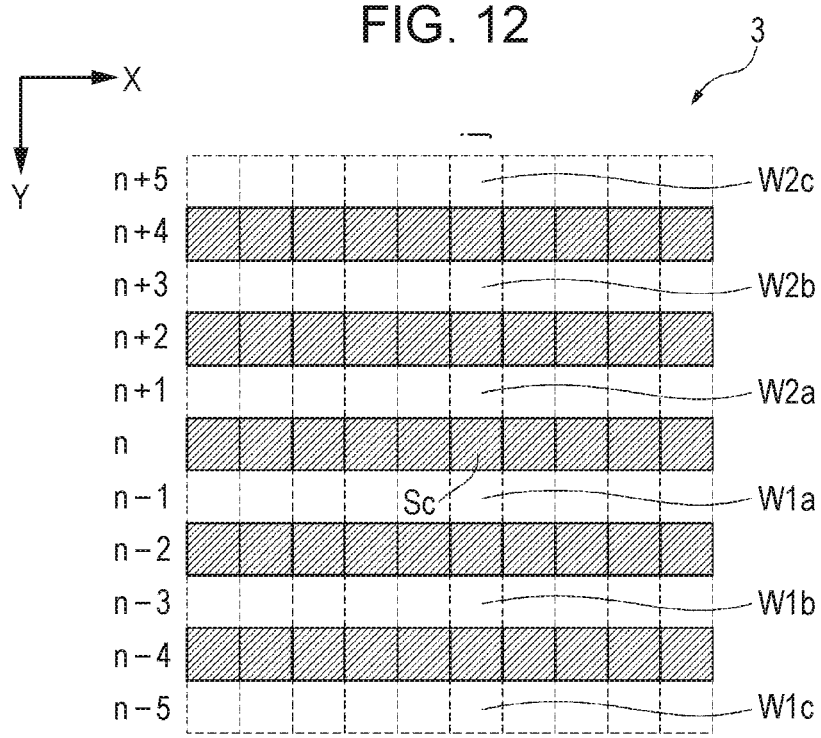
FIG. 12 is a diagram illustrating an example of a color chart of a fourth embodiment.

FIG. 12 is a diagram illustrating the relationship between the arrangement positions (the color measurement positions) of the color measurement target color patches 31 in the color chart 3 and the arrangement positions of the white portions used in the calculation of the reference values.

In the present embodiment, the color measurement method which is carried out by the printer 10 is essentially the same as in the first embodiment except for the process of acquiring the reference values.

When carrying out the color measurement, the printer 10 carries out the spectral measurement for each of the measurement positions in the same manner as in the first embodiment, and acquires the measured values. When performing the color measurement of the color measurement position Sc, the reference value corresponding to the color measurement position Sc is acquired using the measured values of the white portions 32 of each position of a plurality of +Y side positions W1a, W1b, and W1c which are positioned on the +Y side of the color measurement position Sc and a plurality of −Y side positions W2a, W2b, and W2c which are positioned on the −Y side, where all of the white portions 32 which are used belong to the same column as the color measurement position Sc.

In other words, in a case in which the color measurement position Sc is the measurement position P(n, j), the reference value acquisition unit 196 acquires the measured values M(n−1, j), M(n−3, j), and M(n−5, j) at the respective measurement positions P(n−1, j), P(n−3, j), and P(n−5, j) corresponding to the +Y side positions W1a, W1b, and W1c, and the measured values M(n+1, j), M(n+3, j), and M(n+5, j) at the respective measurement positions P(n+1, j), P(n+3, j), and P(n+5, j) corresponding to the −Y side positions W2a, W2b, and W2c. The reference value acquisition unit 196 estimates the fluctuation characteristics of the measured values in the Y direction (the sub-scanning direction) using these measured values and acquires the reference value corresponding to the color measurement position Sc from the estimated result.

Figure 13:
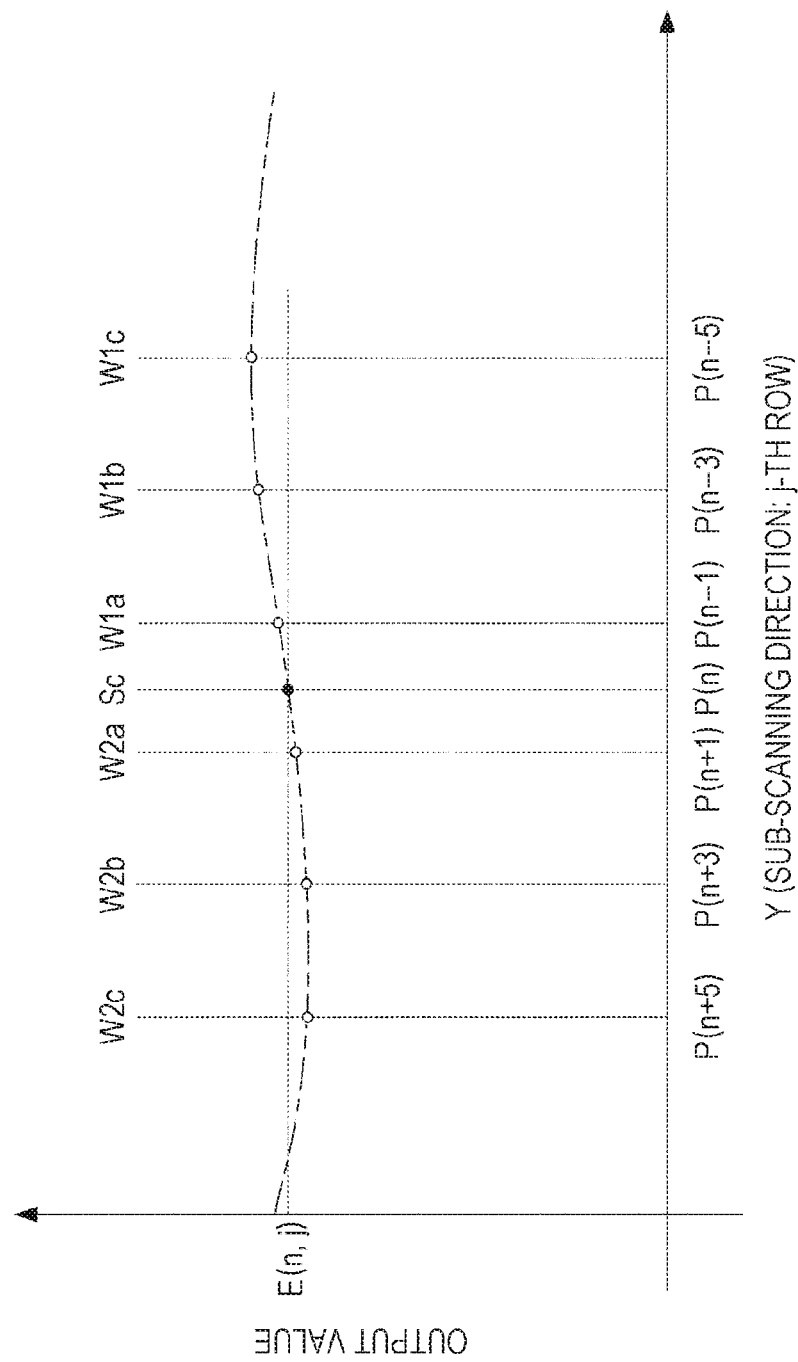
FIG. 13 is a diagram illustrating an example of fluctuation characteristics of the fourth embodiment.

FIG. 13 is a diagram illustrating an example of the output values (the light quantity received by the light receiving section 173) at each of the measurement positions in which the white portions 32 are disposed in the j-th column. Note that, in the example illustrated in FIG. 13, the output values for a predetermined wavelength among the measured values are illustrated as an example. As described above, when waviness occurs in the medium A, the measurement distance L fluctuates, and, as illustrated in FIG. 13, the output values at the predetermined wavelength during the spectral measurement of the white portions 32 become different values between measurement positions belonging to the same column.

In the present embodiment, as described above, the reference value acquisition unit 196 estimates the fluctuation characteristics (refer to the dot-dash line of FIG. 13) of the output values (the measured values) based on the measured values at the plurality of +Y side positions and the plurality of −Y side positions in relation to the color measurement position Sc. The reference value acquisition unit 196 acquires the reference value Ref(n, j) at the color measurement position Sc based on the estimated results of the fluctuation characteristics.

Note that, for example, it is possible to acquire the fluctuation characteristics by estimating the output values of a case in which it is assumed that the white portions 32 are subjected to color measurement along the Y direction in the column including the color measurement position Sc. Specifically, for example, it is possible to acquire the fluctuation characteristics by carrying out polynomial approximation using the output values at the plurality of +Y side positions and the plurality of −Y side positions described above in relation to the measurement position P(n, j). The fluctuation characteristics caused by waviness may be estimated by performing experimental measurement or the like in advance, acquiring the fluctuation characteristics of a plurality of patterns, and selecting the fluctuation characteristics based on the measured values.

The reference value acquisition unit 196 acquires an estimate value E(n, j) corresponding to the measurement position P(n, j) based on the estimated results acquired as described above (refer to FIG. 13), and uses the estimate value E(n, j) as the reference value Ref(n, j) at the measurement position P(n, j).

Note that, in the present embodiment, the estimate value E(n, j) is acquired by referring to the fluctuation characteristics which are acquired using polynomial approximation and acquiring the estimate value of the output values of each of 16 bands at the measurement position P(n, j).

Operation Effects of Fourth Embodiment

According to the present embodiment, in addition to the effects of the embodiments described above, it is possible to obtain the following operation effects.

In the present embodiment, the fluctuation characteristics of the measured values along the Y direction are estimated and the reference value at the measurement position Sc is acquired based on the measured values of the white portions 32 which are disposed at each of the plurality of +Y side positions and the plurality of −Y side positions in relation to the color measurement position Sc.

Accordingly, even if the measurement distance L fluctuates in the Y direction due to waviness of the medium A, it is possible to estimate the fluctuation characteristics of the measured values according to the fluctuation, and to acquire a more appropriate reference value based on the estimated results. Therefore, it is possible to more reliably suppress the influence of fluctuation in the measurement distance L, and to improve the color measurement precision.

Modification Example

Note that, the present disclosure is not limited to the embodiments described above, and configurations obtained by modification, improvement, combination, as appropriate, of the embodiments, and the like within a range in which it is possible to achieve an aspect of the present disclosure are included in the present disclosure.

In the embodiments described above, a case is described in which the color measurement is performed using a color chart including a plurality of color patches and including two white portions which interpose each of the color patches along the Y direction and are adjacent thereto; however, the present disclosure is not limited thereto. For example, an average value may be acquired according to measured values of other white portions, of which there is one or a plurality, besides the two white portions which are adjacent along the Y direction.

The color chart may include at least a color patch and two white portions (reference color regions) interposing the color patch. Hereinafter, description will be given of other examples of color charts.

Figure 14:
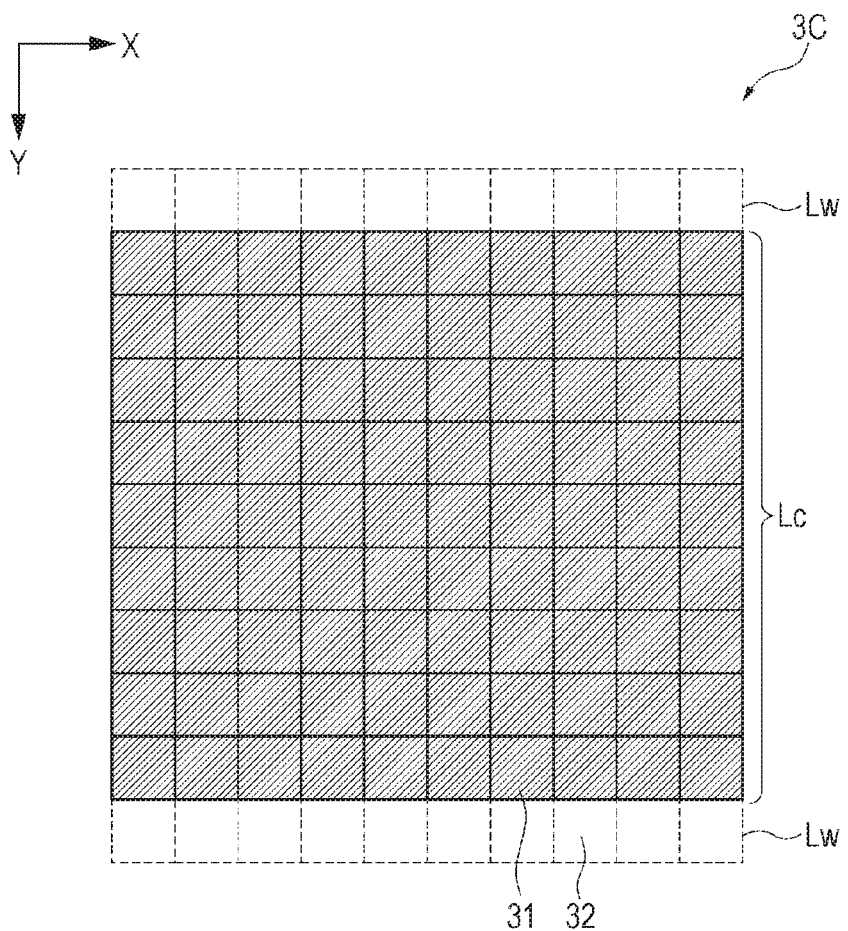
FIG. 14 is a diagram illustrating an example of a color chart of modification example 1.

FIG. 14 is a diagram illustrating modification example 1 of a color chart.

In a color chart 3C illustrated in FIG. 14, the white rows Lw are disposed in the first row and the last row, and the color patch rows Lc are disposed in the other rows. The color patch rows Lc are formed of only the color patches 31.

Even if this color chart 3C is used, it is possible to suppress the influence of waviness of the medium A in the Y direction, and it is possible to obtain an improvement in the color measurement precision.

Figure 15:
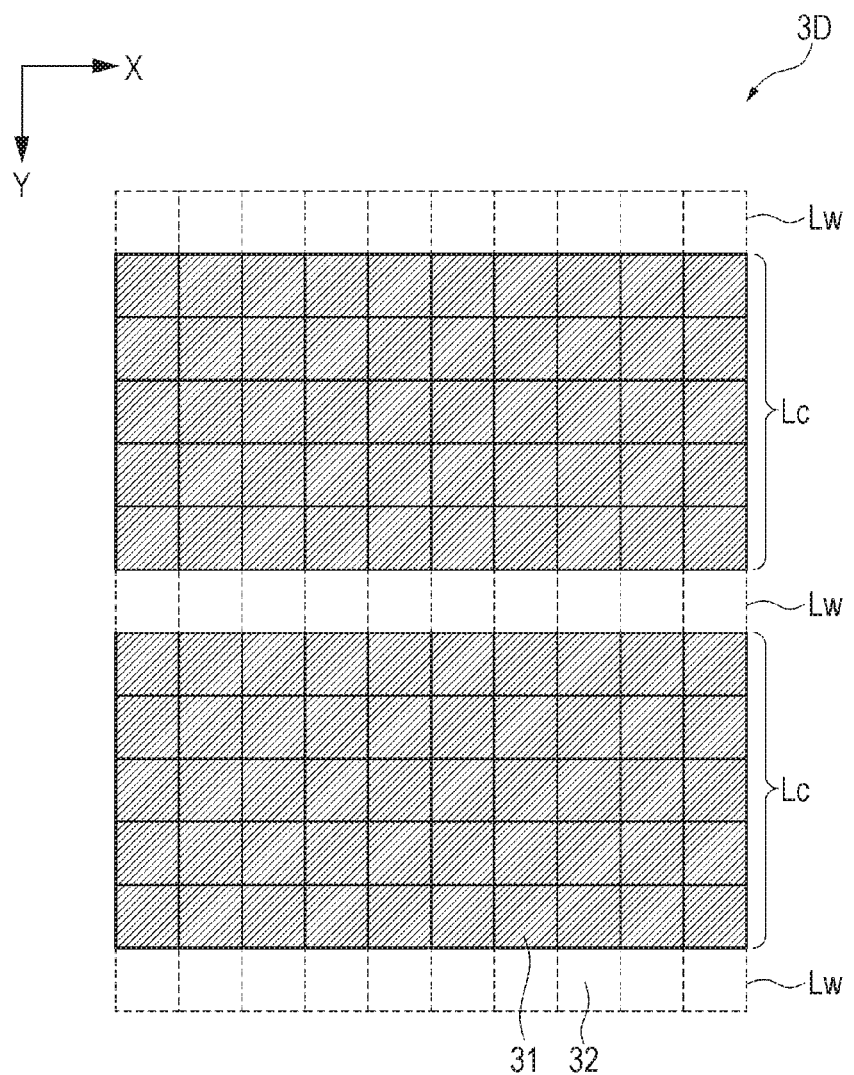
FIG. 15 is a diagram illustrating an example of a color chart of modification example 2.

FIG. 15 is a diagram illustrating modification example 2 of a color chart.

In a color chart 3D illustrated in FIG. 15, the white rows Lw are disposed in the first row, the last row, and at least one row between the first row and the last row, and the color patch rows Lc are disposed in the other rows. The color patch rows Lc are formed of only the color patches 31.

In a case in which the color measurement is carried out using the color chart 3D, for example, the reference value may be acquired using the white portion 32 which is closest to the color measurement target color patch 31 in the +Y direction, and the white portion 32 which is closest in the −Y direction, and the average value of the measured values of a plurality of the white portions 32 may be used as the reference value.

It is possible to obtain an improvement in the color measurement precision in the same manner as a case in which the color chart 3C is used, even if the color chart 3D is used.

With the color chart 3D, it is possible to cause the white portion 32 to be closer to the color measurement target color patch 31 than in a case in which the white rows Lw are only disposed at both ends of the color chart in the Y direction. Therefore, it is possible to reduce the difference between the ideal value of the reference value and the measured values of the white portions 32, and to improve the color measurement precision.

Note that, in the color chart 3D, a plurality of the white rows Lw may be disposed between the first row and the last row.

Figure 16:
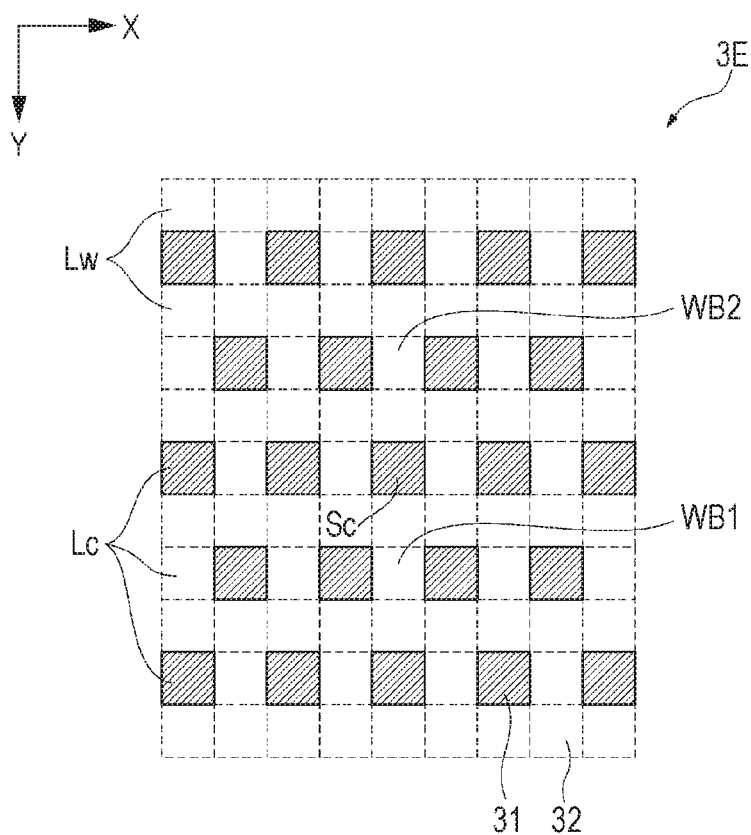
FIG. 16 is a diagram illustrating an example of a color chart of modification example 3.

FIG. 16 is a diagram illustrating modification example 3 of a color chart.

In the fourth embodiment described above, a case is exemplified in which the color chart 3 is used; however, the present disclosure is not limited thereto, and, for example, another color chart such as the one illustrated in FIG. 16 may be used.

In a color chart 3E illustrated in FIG. 16, white band regions WB1 in which a plurality of the white portions 32 are provided in succession are disposed on the +Y sides of the color patches 31, and white band regions WB2 are also disposed on the −Y side in the same manner. Note that, a case in which, in the color chart 3E, the white band region WB1 and the white band region WB2 each include three white portions 32 is illustrated as an example; however, there may be three white portions 32, there may be two white portions 32, and there may be four or more white portions 32.

Note that, in the color chart 3E illustrated in FIG. 16, the color patch rows Lc and the white rows Lw are disposed alternately along the Y direction. In each of the color patch rows Lc, the color patches 31 and the white portions 32 are disposed alternately along the X direction. The color patch rows Lc which are adjacent to each other in the Y direction are disposed offset in the X direction by the amount of the color patch 31 dimensions.

By using the color chart 3E, it is possible to reduce the distance between the white portions 32 which are used in the estimation of the fluctuation characteristics along the Y direction, and it is possible to acquire the fluctuation characteristics over a shorter distance. Accordingly, it is possible to improve the estimation precision of the fluctuation characteristics, and thus, it is possible to improve the color measurement precision.

In the fourth embodiment, the estimation of the fluctuation characteristics is carried out using the measured values of the three white portions 32 in order of proximity to the color measurement target color patch 31 in the +Y direction, and the measured values of the three white portions 32 in order of proximity in the −Y direction in the same manner. However, the present disclosure is not limited thereto, and the measured values of the white portions 32 of arbitrary positions along the Y direction may be used. The positions of the white portions may be selected, as appropriate, according to the degree of waviness of the medium A, the desired color measurement precision, the processing load, or the like.

In the fourth embodiment, the measured values of a plurality of the white portions 32 are used in the estimation of the fluctuation characteristics; however, there is no particular limit to the number of the white portions 32, and the number of the white portions 32 to use may be selected, as appropriate, in consideration of the color measurement precision, the processing load, or the like.

In the fourth embodiment, a configuration is exemplified in which the fluctuation characteristics along the Y direction are estimated; however, the present disclosure is not limited thereto, and the fluctuation characteristics along another direction such as the X direction may be estimated.

The fluctuation characteristics along a plurality of directions may be estimated, and the reference value may be acquired using the fluctuation characteristics. In this case, the reference value may be acquired by acquiring the estimate value of each of the directions and calculating the average value of the plurality of estimate values, for example. For example, a configuration may be adopted in which the fluctuation characteristics are estimated along the three directions: the Y direction, a first direction which intersects the Y direction at 45°, and a second direction which orthogonally intersects the first direction. An estimate value is acquired for each of the three directions, and the average value of the acquired estimate values is used as the reference value.

In the embodiments described above, a configuration is exemplified in which the white region (paper white) on the medium A is used as the reference color region; however, the present disclosure is not limited thereto. For example, the white surface of the medium A is not limited to being white, and may be a predetermined color with a known reflectance. Accordingly, it is possible to use a region in which a color patch is not recorded and the surface of the medium A is exposed as the reference color region.

In the embodiments described above, a configuration provided with the paper retaining unit 15 is exemplified; however, the present disclosure is not limited thereto, and it is also possible to favorably apply the present disclosure to a configuration not provided with the paper retaining unit 15. In other words, even in a case in which waviness of the medium A occurs, it is possible to suppress the influence of the waviness and it is possible to improve the color measurement precision.

In the embodiments described above, a configuration is exemplified in which the carriage 13 is configured to include the printing section 16 and the spectrometer 17, and the printing section 16 and the spectrometer 17 move integrally; however, the present disclosure is not limited thereto. In other words, the printing section 16 and the spectrometer 17 may be provided with separate movement mechanisms.

Note that, in the embodiments described above, it is preferable that the printing section 16 and the spectrometer 17 are configured to be moved by the same movement mechanism, and the printing section 16 and the spectrometer 17 are disposed along the movement direction of the movement mechanism. In this case, since it is possible to acquire the fluctuation characteristics described above at the rendering position of the printing section 16, it is possible to adjust, as appropriate, the ejection timing of the ink of the printing section 16, the transport speed of the medium A, the movement speed of the printing section 16, and the like according to the fluctuation characteristics, and it is possible to obtain an improvement in the rendering quality.

In the embodiments described above, the carriage movement unit 14 which moves the carriage 13 along the X direction is exemplified; however, the present disclosure is not limited thereto. For example, a configuration may be adopted in which the carriage 13 is fixed and the medium A is moved relative to the carriage 13. In this case, it is possible to suppress the vibration of the variable wavelength interference filter 5 which accompanies the movement of the carriage 13, and it is possible to stabilize the transmission wavelength of the variable wavelength interference filter 5.

The transport unit 12 which moves the medium A along the Y direction is exemplified; however, the present disclosure is not limited thereto. For example, a configuration may be adopted in which the carriage 13 is moved in the Y direction relative to the medium A.

In the embodiments described above, a configuration is exemplified in which the unit control circuit 182 is provided in the control unit 18; however, as described above, the control units may be separate from the control unit 18 and provided in each unit. For example, a configuration may be adopted in which a filter control circuit which controls the variable wavelength interference filter 5 and a light reception control circuit which controls the light receiving section 173 are provided in the spectrometer 17. A configuration may be adopted in which a micro controller and a storage memory which stores V-λ data are embedded in the spectrometer 17, and the micro controller controls the variable wavelength interference filter 5 and the light receiving section 173.

In the embodiments described above, the light transmission type variable wavelength interference filter 5 which transmits light of a wavelength corresponding to the gap G between the reflecting films 54 and 55 from the incident light is exemplified as the variable wavelength interference filter 5; however, the present disclosure is not limited thereto. For example, an optically reflective type of variable wavelength interference filter which reflects light of a wavelength corresponding to the gap G between the reflecting films 54 and 55 may be used.

The optical filter device 172 in which the variable wavelength interference filter 5 is stored in the housing 6 is exemplified; however, a configuration may be adopted in which the variable wavelength interference filter 5 is provided directly in the spectrometer 17.

In the embodiments described above, the variable wavelength interference filter 5 is exemplified as the dispersion element; however, the present disclosure is not limited thereto. For example, an acousto optic tunable filter (AOTF) or a liquid crystal tunable filter (LCTF) may be used. However, from the perspective of reducing the size of the device, it is preferable to use a Fabry-Pérot filter as in the embodiments described above.

In the embodiments described above, the ink jet type printing section 16 which ejects inks which are supplied from ink tanks by driving piezo elements is exemplified as the printing section 16; however, the present disclosure is not limited thereto. For example, as the printing section 16, a configuration in which bubbles are generated in the ink using a heater to eject the ink, or a configuration in which the ink is ejected by an ultrasonic oscillator may be adopted.

The printing section 16 is not limited to the ink jet type, and, for example, it is possible to apply to printers of any printing system such as a thermal printer using a heat transfer system, a laser printer, a dot impact printer.

In the embodiments described above, the printer 10 provided with the color measurement device is exemplified; however, the present disclosure is not limited thereto. For example, a color measurement device which is not provided with the printing section 16 (the image forming section) and carries out the color measurement on the medium A may be used. For example, the color measurement device of the present disclosure may be incorporated in electronic equipment such as a quality testing device which performs quality testing of the printed object which is manufactured in a factory or the like. For example, it is possible to apply the color measurement device of the present disclosure to a configuration provided with a movement mechanism such as a belt conveyor which transports a printed object which is a testing target, and a spectrometer which is disposed to face the placement surface of the printed object, where the configuration subjects the printed object which is transported by the movement mechanism to color measurement. Additionally, the color measurement device of the present disclosure may be incorporated in any device.

The specific structure when carrying out the present disclosure may be formed by combining, as appropriate, the embodiments and modification examples within a scope in which an aspect of the present disclosure can be achieved, and may be changed, as appropriate, to other structures or the like.

The entire disclosure of Japanese Patent Application No. 2015-059831 filed Mar. 23, 2015 is expressly incorporated by reference herein.

What is claimed is:

1. A color measurement device, comprising:
a spectrometer that disperses light from a measurement target, wherein the measurement target includes a color patch and a reference color region, the reference color region includes a first position and a second position, the color patch is positioned between the first position and the second position, and the first position, the color patch, and the second position are disposed along a predetermined direction;
a movement mechanism that moves the spectrometer relative to the measurement target; and
a control device that controls operations of the spectrometer and the movement mechanism, wherein:
the spectrometer is operable by the control device to carry out spectral measurement for each of the first position and the second position, and acquires measured values,
the control device determines a reference value corresponding to a color measurement position that is a position in which the color patch is disposed based on the measured values at the first position and the second position, and
the control device determines a color measurement result of the color patch based on the measured values that are acquired when the spectrometer carries out the spectral measurement at the color measurement position and the reference value.

2. The color measurement device according to claim 1, wherein:
the reference color region is disposed in another position differing from the first position and the second position along the predetermined direction, the spectrometer performs the spectral measurement on the measurement target to acquire the measured value at the other position, and the control device determines the reference value based on the measured values at the first position, the second position, and the other position.

3. The color measurement device according to claim 1, wherein:

the spectrometer performs spectral measurement for the color patch that is at a position adjacent to the first position and the second position, and the control device acquires the measured values from the spectrometer.

4. The color measurement device according to claim 3, wherein:

the reference color region includes a region disposed in a third position and a fourth position that interpose the color measurement position along an intersecting direction that intersects the predetermined direction, the spectrometer performs the spectral measurement of the measurement target that includes the first position, the second position, the third position, and the fourth position to acquire measured values at the first position, the second position, the third position, and the fourth position, and the control device determines the reference value based on the measured values at the first position, the second position, the third position, and the fourth position.

5. The color measurement device according to claim 3, wherein:

the control device determines an average value of the measured values corresponding to the reference color region as the reference value corresponding to the color measurement position.

6. The color measurement device according to claim 1, wherein:

the reference color region is disposed in a plurality of positions along the predetermined direction, where the first position and the second position are among the plurality of position, the spectrometer performs the spectral measurement of the measurement target that includes the plurality of positions to acquire measured values at the plurality of positions, and the control device estimates fluctuation characteristics of the measured values based on the measured values from the spectrometer and determines the reference value based on the fluctuation characteristics.

7. The color measurement device according to claim 1, wherein:

the movement mechanism moves the measurement target in the predetermined direction relative to the spectrometer, and the spectrometer performs spectral measurement for the measurement target in which the reference color region is disposed along the predetermined direction.

8. The color measurement device according to claim 7, wherein:

the movement mechanism moves the spectrometer in an intersecting direction that intersects the predetermined direction relative to the measurement target, and the spectrometer performs the spectral measurement for the measurement target in which a plurality of the color patches is disposed along the intersecting direction and the reference color region is disposed in positions interposing each of the plurality of the color patches along the predetermined direction.

9. An image forming apparatus, comprising:
or measurement device according to claim 1, and
an image forming section that forms an image on a medium.

10. An image forming apparatus, comprising:
or measurement device according to claim 2, and
an image forming section that forms an image on a medium.

11. An image forming apparatus, comprising:
or measurement device according to claim 3, and
an image forming section that forms an image on a medium.

12. An image forming apparatus, comprising:
or measurement device according to claim 4, and
an image forming section that forms an image on a medium.

13. An image forming apparatus, comprising:
or measurement device according to claim 5, and
an image forming section that forms an image on a medium.

14. An image forming apparatus, comprising:
or measurement device according to claim 6, and
an image forming section that forms an image on a medium.

15. An image forming apparatus, comprising:
or measurement device according to claim 7, and
an image forming section that forms an image on a medium.

16. An image forming apparatus, comprising:
or measurement device according to claim 8, and
an image forming section which that an image on a medium.

17. Electronic equipment, comprising:
a body; and
or measurement device according to claim 1 operatively associated with the body.

18. Electronic equipment, comprising:
a body; and
the color measurement device according to claim 2 operatively associated with the body.

19. A color chart that is a measurement target which is subjected to color measurement by the color measurement device according to claim 1, the color chart comprising:
a color patch; and
a reference color region which is disposed in positions interposing the color patch along a first direction.

20. A color measurement method using a color measurement device that includes a spectrometer that disperses light from a measurement target, the method comprising:
performing spectral measurement on a measurement target that includes a color measurement position and a reference color region to acquire measured values at the color measurement position and the reference color region, wherein the color measurement position includes a color patch, the reference color region includes a first position and a second position, the color patch is positioned between the first position and the second position, and the first position, the color patch, and the second position are disposed along a predetermined direction;

determining a reference value corresponding to the color measurement position based on the measured values of the first position and the second position; and determining a color measurement result of the color patch based on the measured value of the color measurement position and the reference value.

* * * * *